US012073954B2

(12) United States Patent
Ford et al.

(10) Patent No.: US 12,073,954 B2
(45) **Date of Patent: *Aug. 27, 2024**

(54) SHIELDING FACILITY AND METHOD OF MAKING THEREOF

(71) Applicant: Rad Technology Medical Systems LLC, Aventura, FL (US)

(72) Inventors: John Ford, Madison, TN (US); Ron Johnston, Urbana, IL (US); Cynthia Keppel, Newport News, VA (US); Pawel Ambrozewicz, Newport News, VA (US); Eric Landau, Calabasas, CA (US); Cheri Oquist, Wellington, FL (US); John Lefkus, Annandale, NJ (US)

(73) Assignee: Rad Technology Medical Systems LLC, Aventura, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/077,047

(22) Filed: Dec. 7, 2022

(65) Prior Publication Data

US 2023/0104212 A1 Apr. 6, 2023

Related U.S. Application Data

(63) Continuation of application No. 17/322,726, filed on May 17, 2021, now Pat. No. 11,545,275, which is a (Continued)

(51) Int. Cl.
*G21F 7/00* (2006.01)
*G21F 1/08* (2006.01)
*G21F 3/00* (2006.01)

(52) U.S. Cl.
CPC .................. *G21F 7/00* (2013.01); *G21F 1/08* (2013.01); *G21F 3/00* (2013.01)

(58) Field of Classification Search
CPC ................. G21F 7/00; G21F 1/08; G21F 3/00
(Continued)

(56) References Cited

U.S. PATENT DOCUMENTS 2,726,339 A 12/1955 Borst et al.
2,961,415 A 11/1960 Axelrad
(Continued)

FOREIGN PATENT DOCUMENTS

CN 102490913 A 6/2012
CN 106531266 A 3/2017
(Continued)

OTHER PUBLICATIONS

International Search Report and Written Opinion to corresponding International Application No. PCT/US19/66294, dated May 11, 2020.

*Primary Examiner* — Nicole M Ippolito
(74) *Attorney, Agent, or Firm* — Roberto M. Suarez, Esq.

(57) ABSTRACT

The present disclosure, in an embodiment, is a facility that includes a device configured to generate a beam having an energy range of 5 MeV to 500 MeV, a first radiation shielding wall surrounding the device, a second radiation shielding wall surrounding the first radiation shielding wall, radiation shielding fill material positioned between the first radiation shielding wall and the second radiation shielding wall forming a first barrier. In embodiments, the radiation shielding fill material includes at least fifty percent by weight of an element having an atomic number from 12 to 83, and a thickness of the first barrier is 0.5 meter to 6 meters.

28 Claims, 17 Drawing Sheets
(7 of 17 Drawing Sheet(s) Filed in Color)

Related U.S. Application Data continuation of application No. 17/097,915, filed on Nov. 13, 2020, now Pat. No. 11,437,160, which is a continuation of application No. 16/713,843, filed on Dec. 13, 2019, now Pat. No. 10,878,974.

(60) Provisional application No. 62/779,822, filed on Dec. 14, 2018.

(58) Field of Classification Search
USPC ......... 250/505.1, 506.1, 507.1, 515.1, 516.1, 250/517.1, 518.1, 519.1
See application file for complete search history.

(56) References Cited

U.S. PATENT DOCUMENTS

| | | | | |
|---|---|---|---|---|
| 3,238,148 | A | 3/1966 | Osborne et al. | |
| 3,780,306 | A | 12/1973 | Anderson et al. | |
| 4,229,316 | A | 10/1980 | Baatz | |
| 4,437,013 | A | 3/1984 | Hondorp | |
| 5,061,858 | A | 10/1991 | Mallory | |
| 5,786,611 | A | 7/1998 | Quapp et al. | |
| 5,802,136 | A | 9/1998 | Carol | |
| 6,608,319 | B2 | 8/2003 | Joseph | |
| 6,741,669 | B2 | 5/2004 | Lindquist | |
| 6,927,407 | B2 | 8/2005 | Bruchle et al. | |
| 6,973,758 | B2 | 12/2005 | Zeik et al. | |
| 7,250,119 | B2 | 7/2007 | Sayala | |
| 7,312,466 | B2 | 12/2007 | Caldwell | |
| 7,728,311 | B2 | 6/2010 | Gall | |
| 7,820,993 | B2 | 10/2010 | Fehrenbacher et al. | |
| 8,042,314 | B2 | 10/2011 | Forster | |
| 8,139,705 | B2 | 3/2012 | Fehrenbacher et al. | |
| 8,283,645 | B2 | 10/2012 | Guneysel | |
| 10,878,974 | B2 * | 12/2020 | Ford | G21F 3/04 |
| 11,437,160 | B2 * | 9/2022 | Ford | G21F 1/08 |
| 11,545,275 | B2 * | 1/2023 | Ford | G21F 1/04 |
| 2002/0050371 | A1 | 5/2002 | Czjakowski | |
| 2002/0166293 | A1 | 11/2002 | Zeik | |
| 2003/0070828 | A1 | 4/2003 | Kageyama | |
| 2004/0025448 | A1 | 2/2004 | Puusepp et al. | |
| 2004/0217307 | A1 | 11/2004 | Bruchle et al. | |
| 2005/0286674 | A1 | 12/2005 | Fischer et al. | |
| 2008/0308754 | A1 | 12/2008 | Fehrenbacher et al. | |
| 2011/0198516 | A1 | 8/2011 | Fan et al. | |
| 2013/0015408 | A1 | 1/2013 | Caruncho Rodado | |
| 2013/0082196 | A1 | 4/2013 | Farrell | |
| 2013/0111825 | A1 | 5/2013 | Lefkus, III | |
| 2017/0084358 | A1 | 3/2017 | Osterloh | |
| 2017/0345523 | A1 | 11/2017 | Nactergal et al. | |
| 2021/0098147 | A1 | 4/2021 | Ford et al. | |

FOREIGN PATENT DOCUMENTS

| | | | |
|---|---|---|---|
| CN | 106782728 | A | 5/2017 |
| CN | 107437439 | A | 12/2017 |
| EP | 0220937 | A2 | 5/1987 |
| GB | 1069036 | A | 5/1967 |
| JP | 2004529357 | A | 9/2004 |
| JP | 2009229384 | A | 10/2009 |
| JP | 2009539088 | A | 11/2009 |
| JP | 201510826 | A | 1/2015 |
| JP | 2017181226 | A | 10/2017 |
| JP | 2017211379 | A | 11/2017 |
| KR | 10-0860333 | B1 | 9/2008 |
| WO | 2006034779 | A1 | 4/2006 |
| WO | 2007141223 | A1 | 12/2007 |
| WO | 2008100827 | A1 | 8/2008 |
| WO | 2020123983 | A1 | 6/2020 |

* cited by examiner

SHIELDING FACILITY AND METHOD OF MAKING THEREOF

CROSS-REFERENCE TO RELATED APPLICATIONS

This application is a continuation of U.S. Nonprovisional application Ser. No. 17/322,726 filed May 17, 2021, which is a continuation of U.S. Nonprovisional application Ser. No. 17/097,915 filed Nov. 13, 2020, now U.S. Pat. No. 11,437,160 issued Sep. 6, 2022; which is a continuation of U.S. Nonprovisional application Ser. No. 16/713,843 filed Dec. 13, 2019, now U.S. Pat. No. 10,878,974 issued Dec. 29, 2020, which claims the benefit of and priority to U.S. provisional application Ser. No. 62/779,822 filed Dec. 14, 2018, the disclosures of which are incorporated by reference herein in the their entirety.

FEDERALLY SPONSORED RESEARCH OR DEVELOPMENT

None.

TECHNICAL FIELD

In embodiments, the present disclosure relates generally to the field of radiation shielding and shielding of hadrons such as protons, neutrons, pions, and heavy ions associated with hadron therapy and with applications to shielding of photons in radio therapy. In embodiments, the present disclosure relates generally to the field of radiation shielding, where optimization of shielding material independent from structure may be beneficial, including but not limited to radiation therapy, nuclear power, scientific research, and industrial accelerators

BACKGROUND

Particle generation and acceleration facilities are used in many applications, such as for scientific research, power generation, and industrial non-destructive inspections and medical treatment. Radiation in the form of photon (x-ray and gamma ray) and electron beams have been used for diagnostic, therapeutic, targeting, industrial, aerospace and research purposes for many years. Energy levels employed for these purposes range from the low KeV levels (5 KeV to 250 KeV) up to 25 MeV, with 10 MeV to 25 MeV photon and electron beams representing the highest energies typically employed in radiation therapy today. Since these radiation types and energy levels have historically represented the overwhelming majority of all such uses, the vaults built to contain this radiation have historically employed materials, means and methods most suited to the combination of physics challenges which are unique to those types of radiation and the energy and intensity levels being so employed. Given that set of physics challenges, the goals were relatively simple: stop or contain the electrons and photons and/or any other forms of secondary ionizing radiation produced by interactions of the primary radiation sources. High energy electron beams as well as any secondary (scatter) radiation they produce are relatively easily stopped. High energy photons are much more penetrating and produce much more scatter radiation, and thus require much more substantial shielding structures (vaults). Accordingly, the physics of photon radiation, penetration and attenuation are the dominant considerations in the formulation of conventional radiation therapy shielding solutions; i.e. in the selection of materials used and in the design and construction of the containment vault. Historically, the most commonly employed solution to these physics requirements and constraints has been the concrete vault and/or the concrete block with walls and ceilings ranging from two (2) to eight (8) feet thick wherein the concrete served to satisfy the requirements of shielding while also serving as the structure, or being structurally independent. In recent years, another solution has been introduced that separates the shielding and structural components and satisfies each of these two requirements using different materials. For example, the PRO System vault and the Temporary Radiotherapy Vault (TRV), by RAD Technology Medical Systems, each use an assembly of steel modules to satisfy the structural requirements of the vault and these modules also act as vessels to contain "any sufficiently dense granular material that can be readily and locally sourced" to satisfy the shielding requirement. These existing RAD Technology solutions allow the typical radiation oncology or industrial vaults to be modular and easily transportable, but are often physically larger than a poured concrete or concrete block vault due to the use of shielding materials that are less dense than concrete. The difference in overall size (footprint) is usually not significant enough to be meaningful due to the relatively low energies. But the difference in terms of transportability, recoverability and adaptability represents a paradigm shift in the shielding industry. That said, RAD Technology's existing vaults share one common characteristic with the traditional concrete vault: they are designed and built to shield against mid-range energy photons and even lower energy secondary neutrons produced from them. Secondary neutron radiation, though, is a relatively small and therefore less consequential consideration. By adding an inch or two of borated polyethylene and maybe some additional plywood or gypsum, the small amount of secondary neutron radiation is handled: the fundamental design of the vault remains the same.

In recent years, however, proton accelerators have grown in favor and popularized a new and different treatment modality: Proton Therapy. These proton accelerators operate at energies more than a full order of magnitude greater than photon and electron beam modalities, and come with a whole new set of physics challenges and a consequent need for new shielding solutions. Radiation from the production and/or use of protons, neutrons, or other heavy particles; e.g., hadrons, whether the primary beam or secondary radiation created as a byproduct of the primary beam, must be shielded to protect nearby personnel, the public, and equipment. As such, the facilities that contain this equipment must be designed and constructed to provide adequate attenuation of various radiation types, energies and intensities to prevent exposure to people and, sometimes, equipment—both inside and outside of the facility. Radiation levels both inside and outside of such facilities must also comply with appropriate federal and state regulations.

Proton and other heavy ion accelerator facilities are generally made of concrete walls, ceilings and floors that can have thicknesses of 8 to 20 feet or more. The concrete participates in both the shielding and structure of the facility. This, however, has proven very costly in terms of time, money and real estate (size/footprint). With energies sometimes in excess of 250 MeV/nucleon (proton or neutron) accelerating the more massive proton and heavy ion particles (such as carbon ions), the shielding physics challenges are not only more substantial, but fundamentally different from conventional radiation therapy.

The dominant concern of this new challenge is neutron penetration. Protons and neutrons are over 1800 times more massive than electrons and the accelerating energies of these new particle beam accelerators can be more than 10 times greater than the highest energies traditionally employed in photon and electron beam modalities. Like gamma radiation, neutrons undergo scattering and absorption interactions with matter. These interactions form the basis for methods used to shield neutron radiation. However, unlike gamma radiation, which interacts primarily with the atomic electrons in matter, neutrons interact primarily with the atomic nuclei. Consequently, the types of materials favored for neutron shielding are quite different than the dense, high atomic number absorbers which are most effective in the attenuation of gamma radiation. In general, for fast neutrons, scattering interactions are more likely than capture interactions. Moreover, as the energy of neutrons is reduced through scattering interactions, additional neutron interactions, such as capture, increase in probability and number. Interactions of high energy protons (or heavy ions) with objects or components within the accelerating device, in the air, inside the patient, with other objects in the room, and even with the shielding walls themselves, cause secondary, or scatter, radiation. This also occurs with the traditional photon and electron beam modalities. However, unlike with the photon and electron modalities, the more massive hadronic particles at these higher energies undergo different interactions and produce significant levels of neutron radiation covering a wide spectrum of energies, ranging from near zero up to the beam energy. Each different energy particle undergoes different primary reactions with different reaction probabilities. The protons are essentially fully absorbed in the patient, while the secondary particles produced, photons and most importantly the neutrons—penetrate to the shielding barriers and become the primary shielding challenge. This broad spectrum, high-energy, high-fluence neutron radiation challenge requires a fundamentally different shielding approach.

In addition, a significant challenge of this new radiation environment is "activation" wherein the traditional shielding material-concrete-becomes radioactive due to prolonged exposure to very high energy radiation. Some components of this "activated" concrete take years, and even decades, to decay to safe levels and thereby can represent both an immediate and a long-term safety hazard.

Traditional hadron and radiation facilities have numerous disadvantages from a shielding standpoint. Traditional shielding walls generally consist of a concrete mixture and are formed in place through a continuous pour operation which leads to scheduling difficulties and a great deal of lost time, which translates to lost market opportunity (revenue). The requisite use of extremely thick concrete walls adds to the hadron beam facility's already large cost and footprint, and decreases the amount of usable space, both within the facility and on the property itself. Moreover, it does not allow for easy repair or modification of the resulting structure. Decommissioning and removal of the structure at the end of its useful life is complicated by the need to remove and properly dispose of radioactive material in the shielding barrier. In traditional concrete shielding vaults, some of the concrete barrier material becomes radioactively activated as a result of long term bombardment by large, high energy particles. Having a significant radioactive half-life, that material must either be left in place, secured and isolated from human interaction, or broken down and disposed of in accordance with applicable laws and regulations at significant expense of labor, time and money. In addition, concrete is inhomogeneous, which can lead to inconsistent shielding density or other property variations in the shielding walls and deterioration over time, resulting in incomplete capture and/or slowing of radiative particles.

The use of concrete can also necessitate embedding, within the poured structure, multiple conduits and ducts, which can be large in number and must be, by construct, complicated in path to ensure no voids through the shielding. Because the shielding walls are structural in a conventional poured concrete center, reinforcing bar (rebar) material is also embedded in the concrete walls to increases the tensile strength of the structure. Conduit paths must not only be circuitous to avoid creating shielding voids, but must also be managed within a rebar grid which is costly and time-consuming to design and place.

The shielding solution here presented is non-structural, and therefore no such rebar grid is required. Moreover, conduits can be placed in modules prior to being brought to the site, again reducing total on-site construction time for complicated designs. Unlike poured concrete, should future system changes or upgrades require modifications to or expansions of the conduits or ducts, or should there be problematic issues discovered with an existing layout, the removable fill design solution here presented would allow for modifications to any and all penetrations through the shielding.

In embodiments, the present disclosure addresses the challenges identified herein including, but not limited to (a) removing the need for the shielding to be structural; (b) allowing for easier transport of the shielding material, facilitating re-use or effective decommissioning; (c) facilitating easy installation and removal of shielding materials; (d) optimization of neutron attenuation based on a variety of fundamental process interactions; (e) reduction of long lasting (long half-life) activation of the shielding material and of decommissioning costs and difficulties.

BRIEF SUMMARY OF THE DISCLOSURE

In embodiments, the present disclosure is a facility comprising:

a. a device configured to generate a beam of radiative energy having an energy range of 5 MeV to 500 MeV,
b. a first shielding barrier surrounding the device, wherein a thickness of the first shielding barrier is 0.5 meter to 6 meters, and wherein the first shielding barrier comprises:
   i. a first radiation shielding wall surrounding the device,
   ii. a second radiation shielding wall surrounding the first radiation shielding wall,
   iii. radiation shielding fill material positioned between the first radiation shielding wall and the second radiation shielding wall forming a first barrier, wherein the radiation shielding fill material comprises at least fifty percent by weight of an element having atomic number between 12 and 83, and.

In embodiments, the element having atomic number from 12 to 83 is selected from the group consisting of iron, lead, tungsten and titanium.

In yet another embodiment, the radiation shielding fill material comprises at least fifty percent by weight of at least one of magnetite and hematite.

In another embodiment, the radiation shielding fill material is granular.

In another embodiment, the energy range of the beam is selected from the group consisting of 5 MeV to 70 MeV, 5 MeV to 250 MeV, and 5 MeV to 300 MeV.

In yet other embodiments, at least one of the first radiation shielding wall and the second radiation shielding wall comprises panels mounted onto a structural exoskeleton.

In yet another embodiment, at least one of the first radiation shielding wall and the second radiation shielding wall is steel.

In another embodiment, the facility further comprises a second shielding barrier, wherein the second shielding barrier comprises: a third radiation shielding wall surrounding the second radiation shielding wall of the first shielding barrier; and second radiation shielding fill material is positioned between the second radiation shielding wall and the third radiation shielding wall of the second shielding barrier, wherein the second radiation shielding fill material comprises at least 25 percent by weight of an element having atomic number from 1 to 8, and wherein a thickness of the second shielding barrier is 0.5 meter to 6 meters.

In an embodiment, the third radiation shielding wall comprises panels mounted onto a structural exoskeleton.

In another embodiment, the third radiation shielding wall is steel.

In yet another embodiment, the element having atomic number between 1 and 8 is selected from the group consisting of hydrogen, carbon, oxygen and boron.

In an embodiment, the second radiation shielding fill material comprises at least one of borax, gypsum, colemanite, a plastic composite material, or lime.

In an embodiment, the beam of radiative energy comprises at least one of: particles or photons.

In an embodiment, the particles are hadrons.

In an embodiment, the hadrons comprise at least one of protons, neutrons, pions, deuterons, heavier ions (having A>2), or any combination thereof In yet another embodiment, the present disclosure is a facility comprising:

a. a plurality of electronic devices, b. a first shielding barrier surrounding the plurality of electronic devices, wherein a thickness of the first shielding barrier is 0.5 meter to 6 meters, and wherein the first shielding barrier comprises:

i. a first radiation shielding wall surrounding the plurality of electronic devices, ii. a second radiation shielding wall surrounding the first radiation shielding wall, iii. radiation shielding fill material positioned between the first radiation shielding wall wherein the radiation shielding fill material comprises at least fifty percent by weight of an element having atomic number from 12 to 83.

In yet another embodiment, the element having atomic number between 12 and 83 is selected from the group consisting of iron, lead, tungsten and titanium.

In embodiments, radiation shielding fill material comprises at least fifty percent by weight of at least one of magnetite and hematite.

In embodiments, the radiation shielding fill material is granular.

In an embodiment, at least one of the first radiation shielding wall and the second radiation shielding wall comprises panels mounted onto a structural exoskeleton.

In another embodiment, at least one of the first radiation shielding wall and the second radiation shielding wall is steel.

In another embodiment, the facility comprises a second shielding barrier, wherein the second shielding barrier comprises: a third radiation shielding wall surrounded by the first radiation shielding wall of the first shielding barrier, and a second radiation shielding fill material positioned between the first radiation shielding wall of the first shielding barrier and the third radiation shielding wall of the second shielding barrier, wherein the second radiation shielding fill material comprises at least 25 percent by weight of an element having atomic number from 1 to 8, and wherein a thickness of the second shielding barrier is 0.5 meter to 6 meters.

In embodiments, the third radiation shielding wall comprises panels mounted onto a structural exoskeleton.

In another embodiment, the third radiation shielding wall is steel.

In yet other embodiments, the element having atomic number from 1 to 8 is selected from the group consisting of hydrogen, carbon, oxygen and boron.

In embodiments, the second radiation shielding fill material comprises at least one of borax, gypsum, colemanite, a plastic composite material, or lime.

In some embodiments, the first shielding barrier is structural.

In some embodiments, the first shielding barrier is non-structural.

In some embodiments, the second shielding barrier is structural.

In some embodiments, the second shielding barrier is non-structural.

In some embodiments, there may be additional shielding barriers. For example, there may be three, four, five, six, seven, eight, and so on, shielding barriers. Some or all of these shielding barriers may be structural. Some or all of these shielding barriers may be non-structural.

BRIEF DESCRIPTION OF THE DRAWINGS

The patent or application file contains at least one drawing executed in color. Copies of this patent or patent application publication with color drawings(s) will be provided by the Office upon request and payment of the necessary fee. The present disclosure will be further explained with reference to the attached drawings, wherein like structures are referred to by like numerals throughout the several views. The drawings shown are not necessarily to scale, with emphasis instead generally being placed upon illustrating the principles of the present disclosure. Further, some features may be exaggerated to show details of particular components.

Figure 1A:
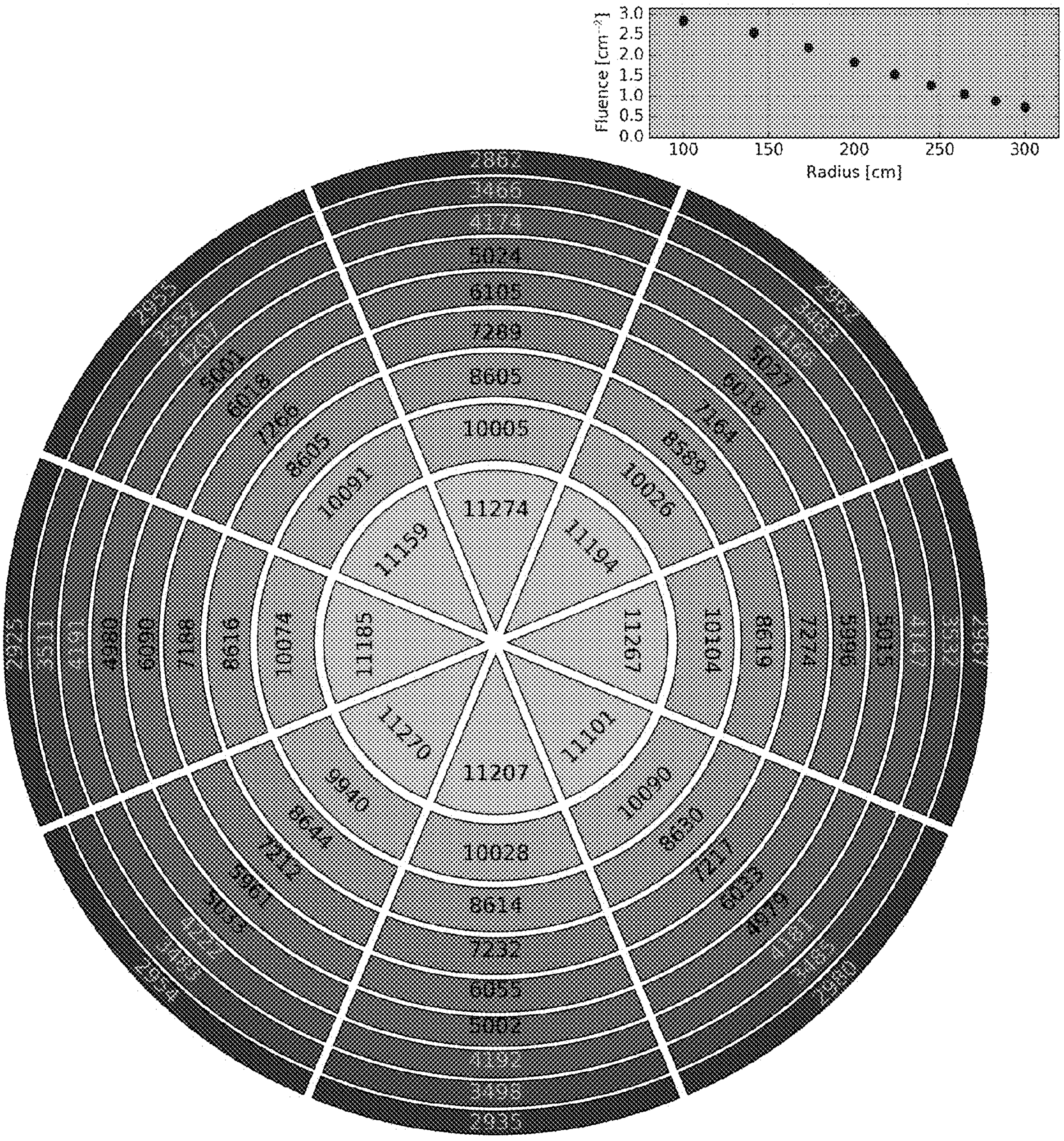
FIGS. 1*a* and 1*b* illustrate unshielded neutron fluence angular distributions on the face of a barrier located directly downstream of a 230 MeV proton beam incident on a water target (simulated proton radiotherapy patient). The center of the circle would be the primary beam impact point, and increasing radius denotes increasing distance from the primary beam axis. In one case (FIG. 1*a*), equal areas are depicted, and in another (FIG. 1*b*), equal radii. It is generally noted that radiation fluence drops off with increasing angular distance from the primary beam in some embodiments.

The figures constitute a part of this specification and include illustrative embodiments of the present disclosure and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present disclosure.

DETAILED DESCRIPTION OF EXAMPLE EMBODIMENTS

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given in connection with the various embodiments of the disclosure which are intended to be illustrative, and not restrictive.

Throughout the specification and claims, the following terms take the meanings explicitly associated herein, unless the context clearly dictates otherwise. The phrases “in one embodiment” and “in some embodiments” as used herein do not necessarily refer to the same embodiment(s), though it may. Furthermore, the phrases “in another embodiment” and “in some other embodiments” as used herein do not necessarily refer to a different embodiment, although it may. Thus, as described below, various embodiments of the disclosure may be readily combined, without departing from the scope or spirit of the disclosure.

In addition, as used herein, the term “or” is an inclusive “or” operator, and is equivalent to the term “and/or,” unless the context clearly dictates otherwise. The term “based on” is not exclusive and allows for being based on additional factors not described, unless the context clearly dictates otherwise. In addition, throughout the specification, the meaning of “a,” “an,” and “the” include plural references. The meaning of “in” includes “in” and “on.”

The following disclosure is used, at least in part, to support the embodiments detailed herein. In embodiments, the present disclosure addresses: (1) hadron beam applications such as proton and heavier ion therapy, and other applications such as power generation where neutron shielding is of primary concern; (2) the use of modular shielding specifically as a method to facilitate optimal shielding material choice and design, such as presented here for broad spectrum neutron attenuation; (3) the use of non-structural, iron-ore (or other) materials that are nonetheless a part of room wall composition; (4) a solution for transportable neutron shielding (as opposed to beam dump and other fixed shielding applications); and (5) the use of multiple barriers of different composition to allow for better optimization of a shielding wall.

In embodiments, the present disclosure is directed to a modular approach to hadron (proton, neutron, pion, heavy ion, etc.) shielding, providing a combination of both transportability in shielding and the ability to tune the radiation shielding solution to optimize for the type of radiation (proton, neutron, pion, etc.), and for a broad and continuous spectrum of energies.

For evaluating the effects of ionizing radiation on humans, the physical dose is determined by measuring the energy absorbed at a given point in a small test volume of a human tissue equivalent medium. For other forms of radiation, neutrons in particular, the biological effect is further dependent on the radiation type and energy. Just as the effects of 1 MeV neutrons are different from the effects of 200 MeV neutrons, the effects, biological and otherwise, of 200 MeV neutrons are vastly different from the effects of 200 MeV protons or 200 MeV photons. In the case of neutrons, the physical (absorbed) dose, expressed as Gray units and measured in joules/kilogram, is multiplied by an energy-dependent Conversion Coefficient, Sv(E) to yield Sievert dose, or effective dose (E). Furthermore, when the radiation energy is a distribution (a spectrum), the product of Sv(E) and fluence, f(E), must be integrated over allrelevant spectral energies. For the convolution of Sv(E) and f(E), Sv(E) must be expressed as an equivalent discontinuous function, $w_k$. The ICRP92, 2007 Publication 103 Radiation Weighting Factors, $w_k$, for radiation type k, are given as numbers and as continuous curves for certain neutron and other particle energy bands as follows:

Weighting Factors: by Particle Type and Energy

- Photons, electrons and muons of all energies: $w_k=1$
- "Slow" or "Thermal" Neutrons of E<1 MeV: $w_k=2.5+18.2\exp(-(1n(E))^2/6)$
- "Fast" Neutrons of E from 1 to 50 MeV: $w_k=5+17.2\exp(-(1n(2E))^2/6)$
- "High Energy Fast" Neutrons of E>50 MeV: $w_k=2.5+3.5\exp(-(1n(0.04E))^2/6)$
- Protons E>2 MeV: $w_k=2$
- Alpha particles, fission fragments and heavy nuclei of all energies: $w_k=20$ (maximum)

Damage to electronics is different from damage to humans, but it also follows an energy-dependent spectrum with a neutron damage peak typically at about 1 MeV which is clearly different from the above, where the higher energy ranges have the largest $w_k$ (weighting) values.

Figure 1B:
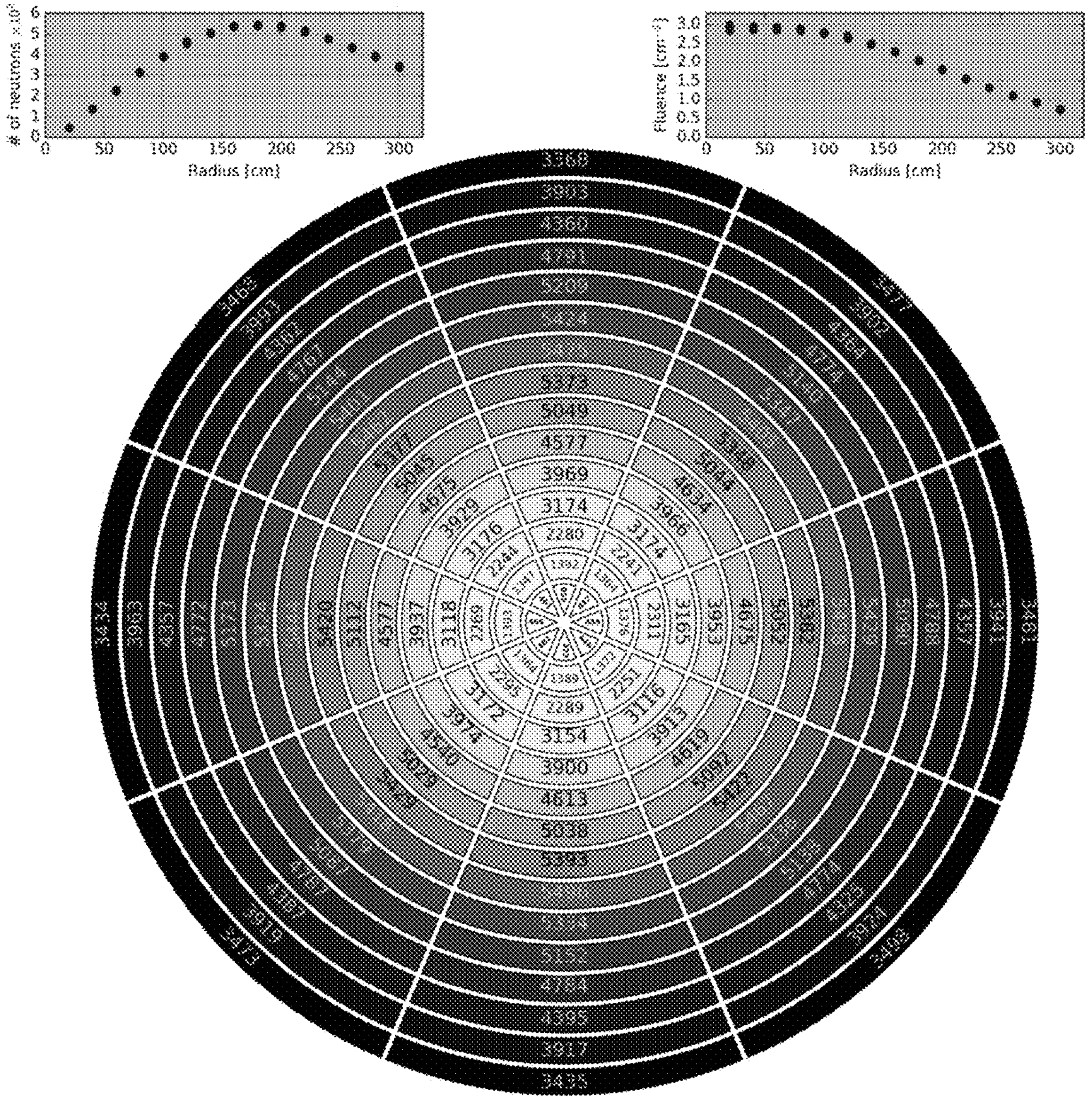

Secondary neutron radiation is the predominant shielding challenge in a proton or other hadronic beam facility such as those used in carbon ion radiotherapy, and in general for many applications involving various high energy beams (hadronic, or others). FIGS. 1*a* and 1*b* demonstrate neutron fluence distributions created from an example proton beam incident on a water phantom (simulating human tissue), or target, using two different approaches. In FIG. 1A, the spatial beam coverage directly downstream of the incident beam on target is divided into equal areas at a typical treatment room distance away. This way, the number of neutrons per area can be viewed directly as corresponding neutron fluence. In FIG. 1B, the area of each segment changes but the increment in radius remains constant. This approach allows one to evaluate to what degree the number of neutrons changes with increasing radius from the primary beam direction. Both approaches, however, result in the same fluence behavior as a function of radius.

Radiation source energy, as well as production geometry, may also be considered in shielding applications. The average neutron energy and fluence can vary with changes in incident beam angle but the maximum energy of the neutron that results from, for example, a 230 MeV proton beam at 0 degrees (perpendicular to the barrier) may be up to the incident proton energy minus the binding energy required to release neutrons from any material in the beam path. As the neutron travels through a shielding barrier, it interacts with the shielding material and the energy of the neutron decreases with each interaction by an amount dependent on the type and severity of interaction. Via these interactions, the neutron energies can decrease to ~eV levels, 6 or more orders of magnitude less than the highest eV energies. This creates a broad spectrum of energies, covering a range of weighting factors ($w_k$) as noted above. Moreover, different beam currents may be utilized for different situations. In a radiation oncology setting, this is typically mandated by the dose prescribed for the patient for a given treatment. However, this fluence can also be energy-dependent as is the case with the energy degrader systems deployed in cyclotron type accelerators.

There are various types of interactions which play a role in neutron attenuation, including, but not limited to, ionization and nuclear fragmentation. Ionization describes the removal of a charged particle from a neutral atom. Nuclear fragmentation processes are where larger nuclei fragment into smaller nuclei.

In some embodiments, the present disclosure is directed to a facility configured to perform "non-destructive testing." As used herein, the term "non-destructive testing" refers to techniques for evaluating the properties of a material, component, or system without causing damage to the material, component, or system.

In some embodiments, the facility configured to perform non-destructive testing includes a device configured to generate a beam having an energy range of 350 kV to 1.5 MeV. In some embodiments, the facility configured to perform non-destructive testing includes a device configured to generate a beam having an energy range of 350 kV to 1 MeV. In some embodiments, the facility configured to perform non-destructive testing includes a device configured to generate a particle beam having an energy range of 350 kV to 500 kV. In some embodiments, the facility configured to perform non-destructive testing includes a device configured to generate a particle beam having an energy range of 350 kV to 400 kV.

In some embodiments, the facility configured to perform non-destructive testing includes a device configured to generate a beam having an energy range of 400 kV to 1.5 MeV. In some embodiments, the facility configured to perform non-destructive testing includes a device configured to generate a beam having an energy range of 500 kV to 1.5 MeV. In some embodiments, the facility configured to perform non-destructive testing includes a device configured to generate a beam having an energy range of 1 MeV to 1.5 MeV.

In some embodiments, the facility configured to perform non-destructive testing includes a device configured to generate a beam having an energy range of 400 kV to 500 MeV. In some embodiments, the facility configured to perform non-destructive testing includes a device configured to generate a beam having an energy range of 400 kV to 1 MeV. In some embodiments, the facility configured to perform non-destructive testing includes a device configured to generate a beam having an energy range of 500 kV to 1 MeV.

In embodiments, the present disclosure, among other things, facilitates optimization of solutions ranging from absorption of slow (thermal) neutrons (<1 MeV) to moderation of fast and high energy fast neutrons (1 MeV up to the beam energy).

In some embodiments, the facility includes a particle beam having an energy range of 5 MeV to 500 MeV located within the first and/or second barriers. In some embodiments, the energy range of the beam or radiation source located within the facility is 5 MeV to 400 MeV. In some embodiments, the energy range of the beam or radiation source located within the facility is 5 MeV to 300 MeV. In some embodiments, the energy range of the beam or radiation source located within the facility is 5 MeV to 250 MeV. In some embodiments, the energy range of the beam or radiation source located within the facility is 5 MeV to 150 MeV. In some embodiments, the energy range of the beam or radiation source located within the facility is 5 MeV to 100 MeV. In, the energy range of the beam or radiation source located within the facility is 5 MeV to 75 MeV. In some embodiments, the energy range of the beam or radiation source located within the facility is 5 MeV to 50 MeV.

In some embodiments, the facility includes a beam or radiation source having an energy range of 50 MeV to 500 MeV located within the first and/or second barriers. In some embodiments, the energy range of the beam or radiation source located within the facility is 100 MeV to 500 MeV. In some embodiments, the energy range of the beam or radiation source located within the facility is 150 MeV to 500 MeV. In some embodiments, the energy range of the beam or radiation source located within the facility is 250 MeV to 500 MeV. In some embodiments, the energy range of the beam or radiation source located within the facility is 300 MeV to 500 MeV. In some embodiments, the energy range of the beam or radiation source located within the facility is 400 MeV to 500 MeV.

In some embodiments, the energy range of the beam or radiation source located within the facility is 1 MeV to 5 MeV.

In some embodiments the energy range of the beam or radiation source located within the facility is not limited. For instance, in some embodiments, the energy can be as low as 1 keV. In some embodiments, the energy can exceed 100 GeV.

In embodiments, the present disclosure provides a shielding solution that is modular and transportable. This is achieved by separating the shielding component of the resulting shielding facility (vault) from its structural component. In other words, the structural goals are achieved using one set of materials and methods while the shielding goals are met using a different set of materials and methods. In embodiments, the present disclosure adopts attenuating materials previously discounted and disregarded due to their absence of structural properties. This fact is here leveraged in particular to allow for broad energy spectrum absorption, but also encompasses other desirable benefits. There are multiple and sometimes conflicting properties determining the desirability and effectiveness of different shielding materials such as, but not limited to, low cost, availability, homogeneity, non-solubility, high density or high atomic number, low atomic number, minimal neutron regeneration, high neutron capture cross section, compactability, ease of use, low toxicity, and low radiation activation potential. In embodiments, the present disclosure relates to hadron beam production and generation, cosmic rays, and any radiation facility structure wherein the shielding is not a structural element of the facility structure and allows for the use of a variety of granular shielding materials.

In embodiments, the first barrier radiation shielding fill material comprises element(s) having an adequate interaction cross-section (a measure of interaction probability which may be measured in barn units) to optimize the shielding performance of the barrier. In embodiments, the radiation shielding fill material may be determine based, at least in part, on the data shown in Table 1 below.

TABLE 1

| Neutron Cross Sections | | | | | | |
|---|---|---|---|---|---|---|
| | Elastic | | Inelastic | | Capture | |
| Element | Δ E (MeV) | Δσ (barn) | Δ E (Mev) | Δσ (barn) | Δ E (Mev) | Δσ (barn) |
| Magnetite | | | | | | |
| $_{8}^{16}O$ | 0.0001-214 | $9.2^{-24}$ $1.0^{-21}$ | 2.74-234 | $4.3^{-26}$-$6.2^{-23}$ | 0.0001-20 | $3.9^{-28}$-$5.4^{-26}$ |
| $_{26}^{56}Fe$ | 0.0001-224 | $4.05^{-23}$-$5.4^{-21}$ | 0.85-20.3 | $8.4^{-24}$-$1.45^{-22}$ | 0.0001-20 | $1.15^{-21}$-$7.0^{-27}$ |
| Colemanite | | | | | | |
| $_{1}^{1}H$ | 0.0001-242 | $2.0^{-21}$-$3.9^{-24}$ | | | $10^{-6}$-20 | $5.3^{-24}$-$2.7^{-27}$ |
| $_{5}^{10}B$ | $10^{-6}$-234 | $1.2^{-23}$ $4.4^{-20}$ | $10^{-6}$-234 | $4.4^{-24}$-$1.0^{-20}$ | 0.01-20 | $8.2^{-30}$-$2.7^{-25}$ |
| $_{8}^{16}O$ | 0.0001-214 | $9.2^{-24}$ $1.0^{-21}$ | 2.74-234 | $4.3^{-26}$-$6.2^{-23}$ | 0.0001-20 | $3.9^{-28}$-$5.4^{-26}$ |
| $_{20}^{40}Ca$ | 0.001-232 | $7.4^{-22}$-$2.4^{-23}$ | 0.1-239 | $1.5^{-29}$-$1.3^{-22}$ | 0.001-20 | $6.3^{-27}$-$8.8^{-23}$ |
| Concrete | | | | | | |
| $_{1}^{1}H$ | 0.001-242 | $2.0^{-21}$-$3.9^{-24}$ | | | $10^{-6}$-20 | $5.3^{-24}$-$2.7^{-27}$ |
| $_{5}^{10}B$ | $10^{-6}$-234 | $1.2^{-23}$ $4.4^{-20}$ | $10^{-6}$-234 | $4.4^{-24}$-$1.0^{-20}$ | 0.01-20 | $8.2^{-30}$-$2.7^{-25}$ |
| $_{8}^{16}O$ | 0.0001-214 | $9.2^{-24}$ $1.0^{-21}$ | 2.74-234 | $4.3^{-26}$-$6.2^{-23}$ | 0.0001-20 | $3.9^{-28}$-$5.4^{-26}$ |
| $_{13}^{27}A1$ | 0.001-232 | $1.6^{-23}$-$2.4^{-21}$ | 1.0-232 | $6.9^{-24}$-$9.8^{-23}$ | 0.001-20 | $4.3^{-27}$-$9.1^{-23}$ |
| $_{14}^{28}Si$ | 0.001-232 | $1.7^{-23}$ $1.3^{-21}$ | 1.275-223 | $2.6^{-25}$-$1.2^{-22}$ | $10^{-6}$-20 | $3.2^{-27}$-$6.7^{-23}$ |
| $_{20}^{40}Ca$ | 0.001-232 | $7.4^{-22}$-$2.4^{-23}$ | 0.1-239 | $1.5^{-29}$-$1.3^{-22}$ | 0.001-20 | $6.3^{-27}$-$8.8^{-23}$ |

Table 1 (above) provides the range of cross sections of interest for shielding for proton therapy cancer treatments for different types of energy absorption mechanisms (elastic and inelastic scattering, and capture reactions). Here, the relatively high capture cross sections for low MeV neutrons in Boron are evident. It is also instructive to look at the elastic scattering cross section range for hydrogen in concrete. Here, the cross section is high for the low energy end of the spectrum, but comparably small for the high energy neutrons.

In embodiments, the present disclosure highlights the optimization of neutron shielding over a broad spectrum of energies. This approach facilitates not only all requisite human protection, but also reduces damage to electronic components where, for example, single event effects (SEEs) and upsets (SEUs) can cause equipment malfunction in treatment rooms, or—in other applications—large warehouse-type computer server facilities or strategic ground-based electronics. SEEs can be an issue even in low dose areas and are caused largely by hadrons such as protons or thermal neutrons.

Without a structural requirement on it, or even a "self-supporting structural integrity" requirement (such as with concrete block), the radiation shielding fill material can be optimized for maximum full energy spectrum neutron absorption, and predominantly for higher energy neutrons through a focus on nucleus fragmentation. Neutrons of different energies are stopped, absorbed or otherwise mitigated by different neutron termination processes. In some embodiments, the present disclosure represents a shielding solution that focuses and capitalizes on nuclear fragmentation (also known as "spallation"), as opposed to the current industry-standard dependence on ionization processes associated with concrete walls.

In embodiments, the present disclosure is configured to provide shielding barriers that increase attenuation levels in the 1 MeV range to provide an application specific radiation barrier for electronic equipment.

In embodiments, the present disclosure is a single barrier comprising a material having element(s) with an atomic number from 12 to 83 (hereinafter "a high-Z element") or a multi-barrier or dual barrier comprising both material having a high-Z element(s) and material having elements with an atomic number from 1 to 8 (hereinafter "a low-Z element"). The role for this can be seen, for example, in a proton therapy facility, where the ~1 MeV neutrons are the dominant concern for radiation damage to electronics, while the quality factor (Q), the multiple of a measured dose, employed in consideration of dose to humans is higher for the ~200 MeV neutrons. The large number of transmitted low energy ("slow", or "thermal") neutrons generated in the last few inches of a treatment room shielding wall do not contribute significantly to the transmitted dose to employees or general population in the center—and so they are typically ignored in concrete and other standard shielding approaches. However, with a binary barrier using embodiments of the present disclosure detailed herein, the low energy neutrons can be absorbed as well in a second barrier to protect also electronics.

In embodiments, the present disclosure is a single barrier comprising a material having element(s) with an atomic number from 12 to 70. In embodiments, the present disclosure is a single barrier comprising a material having element(s) with an atomic number from 12 to 65. In embodiments, the present disclosure is a single barrier comprising a material having element(s) with an atomic number from 12 to 60. In embodiments, the present disclosure is a single barrier comprising a material having element(s) with an atomic number from 12 to 50. In embodiments, the present disclosure is a single barrier comprising a material having element(s) with an atomic number from 12 to 40. In embodiments, the present disclosure is a single barrier comprising a material having element(s) with an atomic number from 12 to 30. In embodiments, the present disclosure is a single barrier comprising a material having element(s) with an atomic number from 12 to 25. In embodiments, the present disclosure is a single barrier comprising a material having element(s) with an atomic number from 12 to 20. In embodiments, the present disclosure is a single barrier comprising a material having element(s) with an atomic number from 12 to 15.

In embodiments, the present disclosure is a single barrier comprising a material having element(s) with an atomic number from 15 to 83. In embodiments, the present disclosure is a single barrier comprising a material having element(s) with an atomic number from 20 to 83. In embodiments, the present disclosure is a single barrier comprising a material having element(s) with an atomic number from 25 to 83. In embodiments, the present disclosure is a single barrier comprising a material having element(s) with an atomic number from 30 to 83. In embodiments, the present disclosure is a single barrier comprising a material having element(s) with an atomic number from 40 to 83. In embodiments, the present disclosure is a single barrier comprising a material having element(s) with an atomic number from 50 to 83. In embodiments, the present disclosure is a single barrier comprising a material having element(s) with an atomic number from 60 to 83. In embodiments, the present disclosure is a single barrier comprising a material having element(s) with an atomic number from 65 to 83. In embodiments, the present disclosure is a single barrier comprising a material having element(s) with an atomic number from 70 to 83.

In embodiments, the present disclosure is a single barrier comprising a material having element(s) with an atomic number from 15 to 70. In embodiments, the present disclosure is a single barrier comprising a material having element(s) with an atomic number from 20 to 65. In embodiments, the present disclosure is a single barrier comprising a material having element(s) with an atomic number from 25 to 60. In embodiments, the present disclosure is a single barrier comprising a material having element(s) with an atomic number from 30 to 50.

In embodiments, the present disclosure is a single-barrier or multi-barrier comprising both material having a high-Z element(s) in any range detailed herein and material having elements with an atomic number from 1 to 8 (hereinafter "a low-Z element"). In embodiments, the present disclosure is a multi-barrier or dual barrier comprising both material having a high-Z element(s) in any range detailed herein and material having elements with an atomic number from 1 to 7. In embodiments, the present disclosure is a multi-barrier or dual barrier comprising both material having a high-Z element(s) in any range detailed herein and material having elements with an atomic number from 1 to 6. In embodiments, the present disclosure is a multi-barrier or dual barrier comprising both material having a high-Z element(s) in any range detailed herein and material having elements with an atomic number from 1 to 5. In embodiments, the present disclosure is a multi-barrier or dual barrier comprising both material having a high-Z element(s) in any range detailed herein and material having elements with an atomic number from 1 to 4. In embodiments, the present disclosure is a multi-barrier or dual barrier comprising both material having a high-Z element(s) in any range detailed herein and material having elements with an atomic number from 1 to 3. In embodiments, the present disclosure is a multi-barrier or dual barrier comprising both material having a high-Z element(s) in any range detailed herein and material having elements with an atomic number from 1 to 2.

In embodiments, the present disclosure is a multi-barrier or dual barrier comprising both material having a high-Z element(s) in any range detailed herein and material having elements with an atomic number from 2 to 8. In embodiments, the present disclosure is a multi-barrier or dual barrier comprising both material having a high-Z element(s) in any range detailed herein and material having elements with an atomic number from 3 to 8. In embodiments, the present disclosure is a multi-barrier or dual barrier comprising both material having a high-Z element(s) in any range detailed herein and material having elements with an atomic number from 4 to 8. In embodiments, the present disclosure is a multi-barrier or dual barrier comprising both material having a high-Z element(s) in any range detailed herein and material having elements with an atomic number from 5 to 8. In embodiments, the present disclosure is a multi-barrier or dual barrier comprising both material having a high-Z element(s) in any range detailed herein and material having elements with an atomic number from 6 to 8. In embodiments, the present disclosure is a multi-barrier or dual barrier comprising both material having a high-Z element(s) in any range detailed herein and material having elements with an atomic number from 7 to 8.

In embodiments, the present disclosure is a multi-barrier or dual barrier comprising both material having a high-Z element(s) in any range detailed herein and material having elements with an atomic number from 2 to 7. In embodiments, the present disclosure is a multi-barrier or dual barrier comprising both material having a high-Z element(s) in any range detailed herein and material having elements with an atomic number from 3 to 6. In embodiments, the present disclosure is a multi-barrier or dual barrier comprising both material having a high-Z element(s) in any range detailed herein and material having elements with an atomic number from 4 to 5.

In embodiments, the present disclosure herein described can fulfill decommissioning requirements because it provides for a way to more easily extract the shielding material from the walls by it being a loose granular fill material, and because there is potentially less material that is susceptible to long term activation.

Moreover, because the potentially radioactive shielding material to be removed could be chosen to have a substantially faster decay time (shorter half-life) measured in seconds, days or weeks rather than years or decades, and because it is not a structural part of the building, there is greater overall safety during the decommissioning process. With the design presented herein, unlike in conventional concrete shielded structures, the overall structure may remain intact and safe for workers while the shielding material is removed.

In embodiments, the present disclosure provides a new approach to the construction of hadron beam facilities in which the facility is constructed with an inner and outer exoskeleton that provides the structure of the building. Between the inner and outer exoskeleton is a series of containers, vessels, or voids formed between inner and outer walls comprising, or mounted on, the exoskeleton. These voids are filled with a radiation shielding fill material that is non-structural. As used herein, the term “non-structural” means non-load bearing; not even capable of being self-supporting as in the case of concrete blocks. Thus, a material that is “non-structural” does not solidify or provide structure or support of any kind. Because the radiation shielding fill material is non-structural, unlike concrete which is structural, the composition of the radiation shielding fill material can be selected primarily for its radiation shielding capabilities and its mechanism of shielding without regard to any structural considerations or requirements.

In embodiments of the present disclosure, the radiation shielding fill material is positioned between a first radiation shielding wall and a second radiation shielding wall forming a first barrier. In some embodiments, the radiation shielding fill material includes material with high-Z elements and/or other materials that rely on nuclear fragmentation as the predominant method of attenuation. Non-limiting examples of radiation shielding fill material high-Z elements include iron, lead, tungsten and titanium. In some embodiments, the radiation shielding fill material includes magnetite, hematite, goethite, limonite or siderite. In embodiments, the radiation shielding fill material is in the form of an aggregate and thus, is a granular material.

In embodiments of the present disclosure, the radiation shielding fill material comprises at least fifty percent by weight of at least one high-Z element. In embodiments of the present disclosure, the radiation shielding fill material comprises at least sixty percent by weight of at least one high-Z element. In embodiments of the present disclosure, the radiation shielding fill material comprises at least seventy percent by weight of at least one high-Z element. In embodiments of the present disclosure, the radiation shielding fill material comprises at least eighty percent by weight of at least one high-Z element. In embodiments of the present disclosure, the radiation shielding fill material comprises at least ninety percent by weight of at least one high-Z element. In embodiments of the present disclosure, the radiation shielding fill material comprises at least 95 percent by weight of at least one high-Z element.

In embodiments of the present disclosure, the radiation shielding fill material comprises at least fifty percent by weight of iron, lead, tungsten, titanium, or combinations thereof. In embodiments of the present disclosure, the radiation shielding fill material comprises at least sixty percent by weight of iron, lead, tungsten, titanium, or combinations thereof. In embodiments of the present disclosure, the radiation shielding fill material comprises at least seventy percent by weight of iron, lead, tungsten, titanium, or combinations thereof. In embodiments of the present disclosure, the radiation shielding fill material comprises at least eighty percent by weight of iron, lead, tungsten, titanium, or combinations thereof. In embodiments of the present disclosure, the radiation shielding fill material comprises at least ninety percent by weight of iron, lead, tungsten, titanium, or combinations thereof. In embodiments of the present disclosure, the radiation shielding fill material comprises at least 95 percent by weight of iron, lead, tungsten, titanium, or combinations thereof In embodiments, the selection of the high-Z element(s) for the radiation shielding is based, at least in part, on the nuclear binding energy. Iron, in its various forms (isotopes), is the most abundant element on earth while nickel is the twenty second most abundant element in the earth’s crust and not very accessible or cheap. Of all nuclides, iron has the lowest mass per nucleon and highest nuclear binding energy (8.8 MeV per nucleon in 56Fe, the most common iron isotope at 91.75% natural abundance), rendering it one of the most tightly bound nuclei, exceeded only by 58Fe (0.28% natural abundance) and the rare 62Ni (3.6% natural abundance). We here employ these facts for shielding. Iron-ore materials have the largest binding energy of all readily available shielding materials. This means that more energy is needed (expended), on average, to knock a neutron free from an iron nucleus than from other nuclei and, therefore, these materials absorb substantial energy—making iron an optimal, while also available, shielding material—in the fragmentation processes being herein leveraged by some embodiments of the present disclosure.

Iron-ore materials enhance the natural “Faraday cage” environment of the steel modules which contain them. This is important to applications where electromagnetic fields may cause background noise or interference with signals of interest, for instance, in sensitive research laboratory equipment or in medical applications such as Magnetic Resonance Imaging (MRI). Faraday cages are used specifically to protect sensitive electronic equipment from external radio frequency interference (RFI), or to enclose devices that produce RFI, such as cellular and radio transmitters, to prevent their radio waves from interfering with other nearby equipment. They are also used to protect people and equipment against electric currents such as electrostatic discharges. Emergency radio communications typically found at medical facilities could also be subject to interference.

In some embodiments, a thickness of the first barrier is 0.5 meters to 10 meters. In some embodiments, a thickness of the first barrier is 0.5 meters to 9 meters. In some embodiments, a thickness of the first barrier is 0.5 meters to 8 meters. In some embodiments, a thickness of the first barrier is 0.5 meters to 7 meters. In some embodiments, a thickness of the first barrier is 0.5 meters to 6 meters. In some embodiments, a thickness of the first barrier is 0.5 meters to 5 meters. In some embodiments, a thickness of the first barrier is 0.5 meters to 4 meters. In some embodiments, a thickness of the first barrier is 0.5 meters to 3 meters. In some embodiments, a thickness of the first barrier is 0.5 meters to 2 meters. In some embodiments, a thickness of the first barrier is 0.5 meters to 1 meters.

In some embodiments, a thickness of the first barrier is 1 meters to 10 meters. In some embodiments, a thickness of the first barrier is 2 meters to 10 meters. In some embodiments, a thickness of the first barrier is 3 meters to 10 meters. In some embodiments, a thickness of the first barrier is 4 meters to 10 meters. In some embodiments, a thickness of the first barrier is 5 meters to 10 meters. In some embodiments, a thickness of the first barrier is 6 meters to 10 meters. In some embodiments, a thickness of the first barrier is 7 meters to 10 meters. In some embodiments, a thickness of the first barrier is 8 meters to 10 meters. In some embodiments, a thickness of the first barrier is 9 meters to 10 meters.

In some embodiments, a thickness of the first barrier is 2 meters to 9 meters. In some embodiments, a thickness of the first barrier is 3 meters to 8 meters. In some embodiments, a thickness of the first barrier is 4 meters to 7 meters. In some embodiments, a thickness of the first barrier is 5 meters to 6 meters.

In some embodiments, the first barrier or the second barrier comprises a plurality of sensors. In other embodiments, the sensors are configured to detect when the shielding material in the first barrier should be removed. In embodiments, the sensors are configured to detect when the shielding material in the first barrier has been activated. In embodiments, the sensors are timers configured to determine when to remove the shielding material in the first barrier. In embodiments, the sensors are calibrated to measure radiation produced within the enclosed vault.

In embodiments, a second barrier of a different shielding material is utilized. Here, high energy fast neutrons are stopped or slowed by reactions within a high density (for instance material with high-Z element(s)), but these reactions cause the creation of lower energy fast and/or slow or thermal neutrons. For the latter, high density materials do not necessarily provide the optimal shielding, as different reactions are dominant in different energy ranges. To optimally absorb this lower energy radiation, secondary inner barriers that include at least one low-Z element may be deployed. Such a second inner barrier may be provided, for instance, within a treatment room to protect electronics. Alternatively, such a second outer barrier may be provided, for instance, external to the treatment room wall to provide additional protection for employees.

In embodiments, a multi-barrier option may also be deployed wherein for example the high-density material is encased on both sides by a material having low-Z elements as above to accomplish both interior and exterior low energy shielding optimization. This approach could be used additionally for cases of, for example, side-by-side treatment rooms where either interior or exterior shielding is needed, but the interior of one room is the exterior of the neighboring room.

In embodiments of the present disclosure, the radiation shielding fill material is positioned between a second radiation shielding wall and a third radiation shielding wall forming the second barrier. In some embodiments, the radiation shielding fill material includes material with low-Z elements. Non-limiting examples of radiation shielding fill material low-Z elements include hydrogen, carbon, oxygen and boron. In some embodiments, the radiation shielding fill material includes at least one of borax, gypsum, colemanite, a plastic composite material, or lime. In embodiments, the radiation shielding fill material is in the form of an aggregate and thus, is a granular material.

In embodiments of the present disclosure, the radiation shielding fill material forming the second barrier comprises at least fifty percent by weight of at least one low-Z element. In embodiments of the present disclosure, the radiation shielding fill material forming the second barrier comprises at least sixty percent by weight of at least one low-Z element, the radiation shielding fill material forming the second barrier comprises at least seventy percent by weight of at least one low-Z element. In embodiments of the present disclosure, the radiation shielding fill material forming the second barrier comprises at least eighty percent by weight of at least one low-Z element. In embodiments of the present disclosure, the radiation shielding fill material forming the second barrier comprises at least ninety percent by weight of at least one low-Z element. In embodiments of the present disclosure, the radiation shielding fill material forming the second barrier comprises at least 95 percent by weight of at least one low-Z element.

In embodiments of the present disclosure, the radiation shielding fill material forming the second barrier comprises at least fifty percent by weight of hydrogen, carbon, oxygen, boron, or combinations thereof. In embodiments of the present disclosure, the radiation shielding fill material forming the second barrier comprises at least sixty percent by weight of hydrogen, carbon, oxygen, boron, or combinations thereof. In embodiments of the present disclosure, the radiation shielding fill material forming the second barrier comprises at least seventy percent by weight of hydrogen, carbon, oxygen, boron, or combinations thereof. In embodiments of the present disclosure, the radiation shielding fill material forming the second barrier comprises at least eighty percent by weight of hydrogen, carbon, oxygen, boron, or combinations thereof. In embodiments of the present disclosure, the radiation shielding fill material forming the second barrier comprises at least ninety percent by weight of hydrogen, carbon, oxygen, boron, or combinations thereof In embodiments of the present disclosure, the radiation shielding fill material forming the second barrier comprises at least 95 percent by weight of hydrogen, carbon, oxygen, boron, or combinations thereof In some embodiments, a thickness of the second barrier is 0.5 meters to 10 meters. In some embodiments, a thickness of the second barrier is 0.5 meters to 9 meters. In some embodiments, a thickness of the second barrier is 0.5 meters to 8 meters. In some embodiments, a thickness of the second barrier is 0.5 meters to 7 meters. In some embodiments, a thickness of the second barrier is 0.5 meters to 6 meters. In some embodiments, a thickness of the second barrier is 0.5 meters to 5 meters. In some embodiments, a thickness of the second barrier is 0.5 meters to 4 meters. In some embodiments, a thickness of the second barrier is 0.5 meters to 3 meters. In some embodiments, a thickness of the second barrier is 0.5 meters to 2 meters. In some embodiments, a thickness of the second barrier is 0.5 meters to 1 meters.

In some embodiments, a thickness of the second barrier is 1 meters to 10 meters. In some embodiments, a thickness of the second barrier is 2 meters to 10 meters. In some embodiments, a thickness of the second barrier is 3 meters to 10 meters. In some embodiments, a thickness of the second barrier is 4 meters to 10 meters. In some embodiments, a thickness of the second barrier is 5 meters to 10 meters. In some embodiments, a thickness of the second barrier is 6 meters to 10 meters. In some embodiments, a thickness of the second barrier is 7 meters to 10 meters. In some embodiments, a thickness of the second barrier is 8 meters to 10 meters. In some embodiments, a thickness of the second barrier is 9 meters to 10 meters.

In some embodiments, a thickness of the second barrier is 2 meters to 9 meters. In some embodiments, a thickness of the second barrier is 3 meters to 8 meters. In some embodiments, a thickness of the second barrier is 4 meters to 7 meters. In some embodiments, a thickness of the second barrier is 5 meters to 6 meters.

In some embodiments, the first barrier comprises material having low-Z elements and the second barrier comprises material having high-Z elements. In other words, in some embodiments, the first barrier is configured consistent with the configuration of the second barrier detailed herein and the second barrier is configured consistent with the configuration of the first barrier as detailed herein.

In embodiments, at least one of the first and/or second barrier comprises a combination of material having low-Z elements and material having high-Z elements.

In embodiments, the facility may include third, fourth, fifth, sixth, seventh or more barriers having material and thicknesses detailed herein with respect to the first and/or second barriers depending on the requirements of the facility.

In embodiments, any of the barriers (first, second, third, fourth or more) may be formed of a plurality of sections. In embodiments, the plurality of sections of each barrier may be configured to allow for removal of a portion of the radiation fill material forming the barrier. In embodiments, the barrier may be comprised of individual modular sections that may be combined to form the first and/or second barriers. In embodiments, each of the individual modular sections may be removed after use and replaced with a modular section filled with unused radiation shielding fill material. In embodiments, one or more of the individual modular sections may include a sensor as detailed herein for indicating when the radiation barrier fill material in the section requires replacement.

In embodiments, certain materials can be used as sensors to determine a dose of radiation. For instance, plastic turns yellow in the presence of radiation and also darkens at a certain level.

In embodiments, the present disclosure includes a shielding wall containing an optimized radiation shielding fill material that does not need to be as thick as a shielding wall made from non-optimized materials such as concrete to achieve the same level of radiation shielding. In embodiments, a shielding wall of a proton beam facility having shielding walls filled with material comprising high-Z elements as detailed herein can be reduced in thickness by 5% to 25% as compared to a concrete or concrete block shielding wall while providing the same or better shielding capability. In some embodiments, the radiation shielding fill material includes a series of voids that are filled with different radiation shielding materials so as to provide different barriers of shielding in certain directions, which can serve to provide more specifically tailored radiation shielding capabilities and/or size efficiencies.

Figure 2:
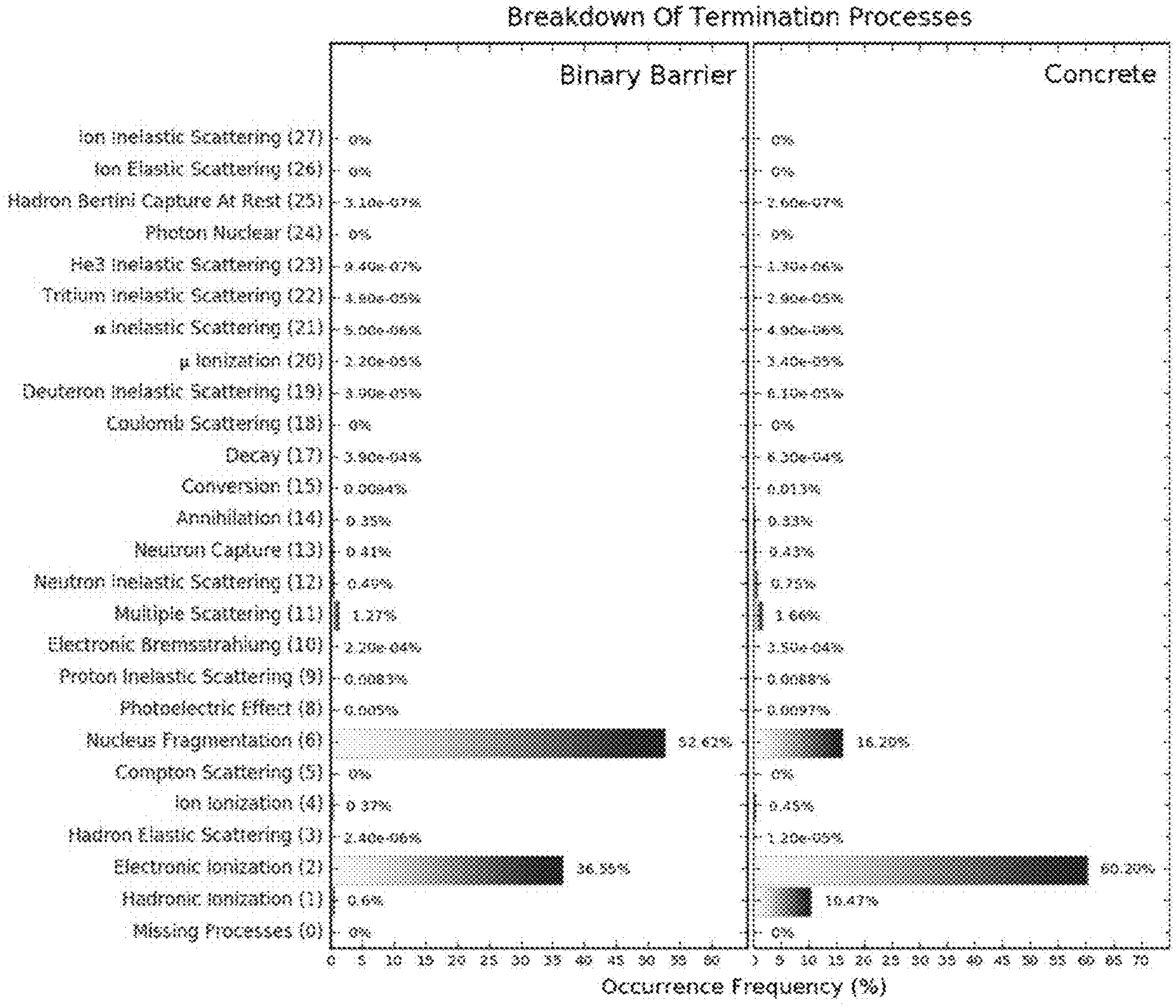
FIG. 2 illustrates the relative distribution of processes that contribute to final termination of motion of neutrons traversing a binary shielding wall/barrier composed of Magnetite and Colemanite aggregates according to an embodiment of the present disclosure as compared to a prior art barrier composed of poured concrete. In some embodiments, a difference in dominant interaction between the barrier materials is of note.

FIG. 2 shows the relative distribution of processes that contribute to final termination of motion of neutrons traversing a binary shielding wall/barrier composed of Magnetite and Colemanite aggregates (left, identified as a "binary barrier") according to an embodiment of the present disclosure as compared to a prior art barrier composed of poured concrete (right). The numbers were obtained from a GEANT4 Monte Carlo simulation, where the neutrons were produced in a water target simulating a patient in a proton radiotherapy treatment room.

As used herein, a "GEANT4 Monte Carlo simulation" is developed to determine transmitted neutron dose as the basis for the barrier neutron attenuation performance, Geant4 is a publicly-available (see http://geant4.web.cern.ch) "toolkit" for the simulation of the passage of particles through matter. Its areas of application include high energy, nuclear and accelerator physics, as well as studies in medical and space science. The three main reference papers for Geant4 are published in Nuclear Instruments and Methods in Physics Research A 506 (2003) 250-303, IEEE Transactions on Nuclear Science 53 No. 1 (2006) 270-278 and Nuclear Instruments and Methods in Physics Research A 835 (2016) 186-225.

Figure 3:
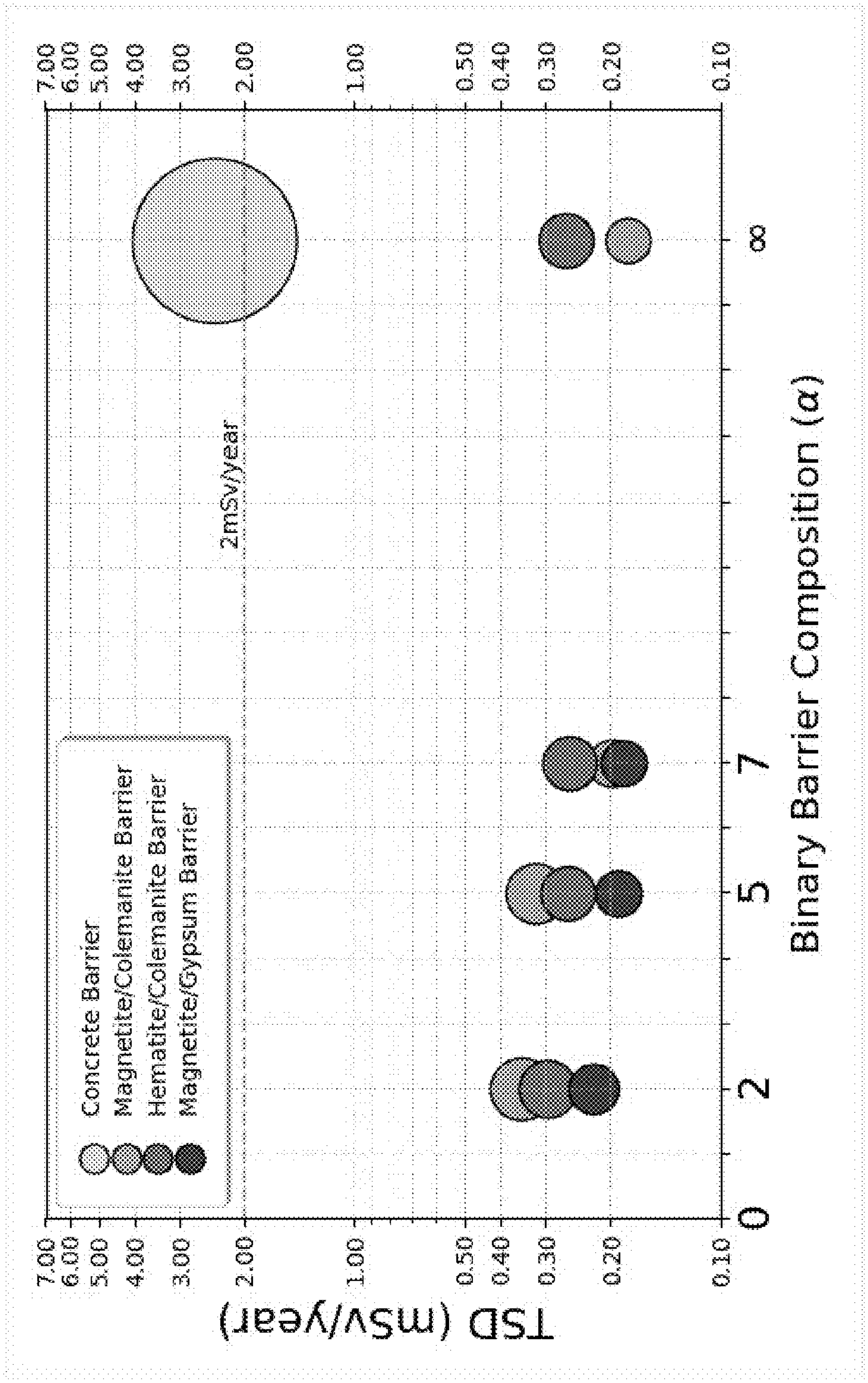
FIG. 3 illustrates the performance of a conventional concrete wall and a modular, transportable binary barrier wall as a function of varying, relative amounts of different materials, according to an embodiment of the present disclosure. This study is for a 3 m total binary barrier thickness, with alpha=the ratio of thicknesses of a first barrier (A) element to a second, subsequent, barrier (B) element. Hence, alpha=infinity is a non-composite, single material 3 m wall composed of material A. Circle size is a graphical representation of the corresponding dose value. The 2 mSv/year annual dose line typically utilized for safe shielding design is shown. Non-concrete materials may provide superior shielding (i.e., reduced transmitted dose per the same thickness).
Figure 4:
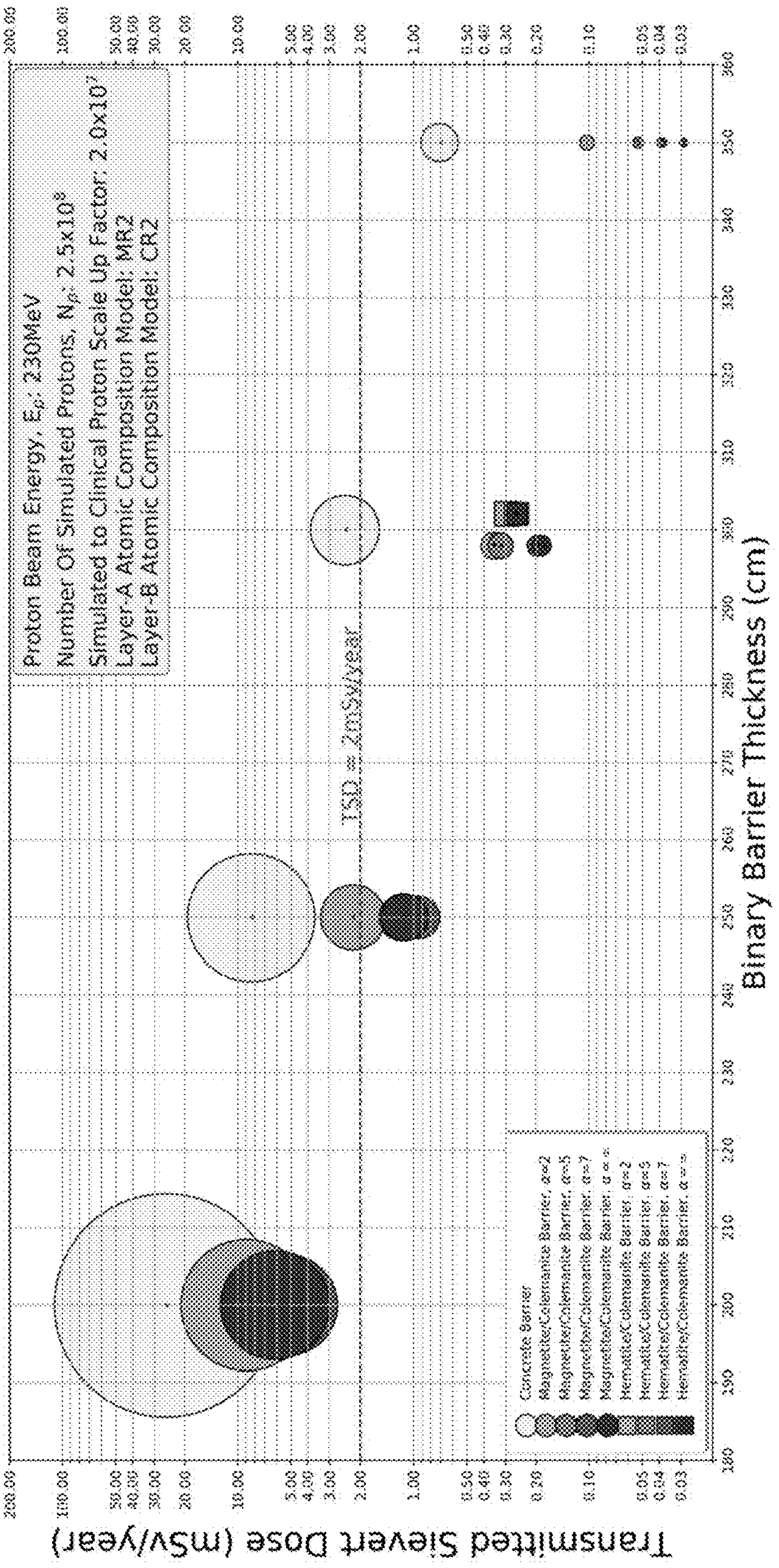
FIG. 4 illustrates the performance of a conventional concrete wall and a modular, transportable binary barrier wall composed of varying, relative amounts of Magnetite and Colemanite (circles), and Hematite and Colemanite (squares), according to an embodiment of the present disclosure as a function of total barrier thickness. Here, alpha=the ratio of thicknesses of a first barrier (A) to a second (B). Hence, alpha=infinity is a non-composite, single material wall composed of material A. The 2 mSv/year annual dose line typically utilized for safe shielding design is shown. Here again, in some embodiments, the alternate materials may be superior to concrete.

FIGS. 3 and 4 and Table 2 present examples of different materials studied for binary and non-binary wall composition. This study is for a 3 m total binary barrier thickness, with alpha=the ratio of thicknesses of a first barrier (A) element to a second subsequent barrier (B) element. Hence, alpha=infinity is a non-composite, single material 3m wall composed of material
A.

TABLE 2

| | A | | | |
|---|---|---|---|---|
| | 2 | 5 | 7 | ∞ |
| Barrier Composition | Transmitted Sievert Dose (mSv/year) | | | |
| Concrete | — | — | — | 2.404 |
| Magnetite + Colemanite | 0.348 | 0.318 | 0.197 | 0.178 |
| Hematite + Colemanite | 0.295 | 0.260 | 0.257 | 0.263 |
| Magnetite + Gypsum | 0.221 | 0.189 | 0.183 | 0.178 |

Figure 5:
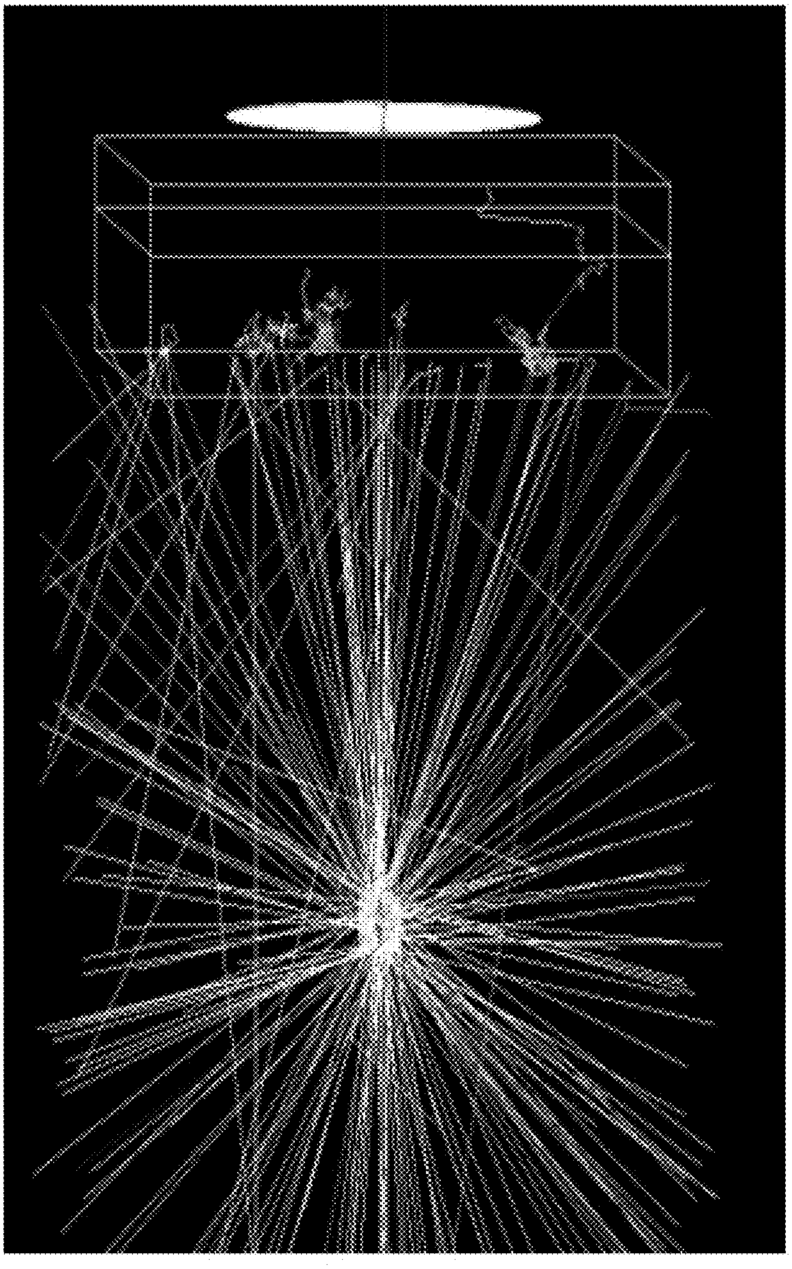
FIGS. 5, 6*a*, 6*b*, and 6*c* each illustrate a GEANT4 ray-trace of a proton beam incident on a water target cylinder simulating a patient producing neutrons and other particles emanating from the target, passing through a binary barrier according to an embodiment of the present disclosure, and finally through a simulated detector volume to assess transmitted dose. Paths for photons (black) and neutrons (gray) absorbed in the barrier wall are visible. The color version of FIG. 5 shows other particles in green and blue.
Figure 6A:
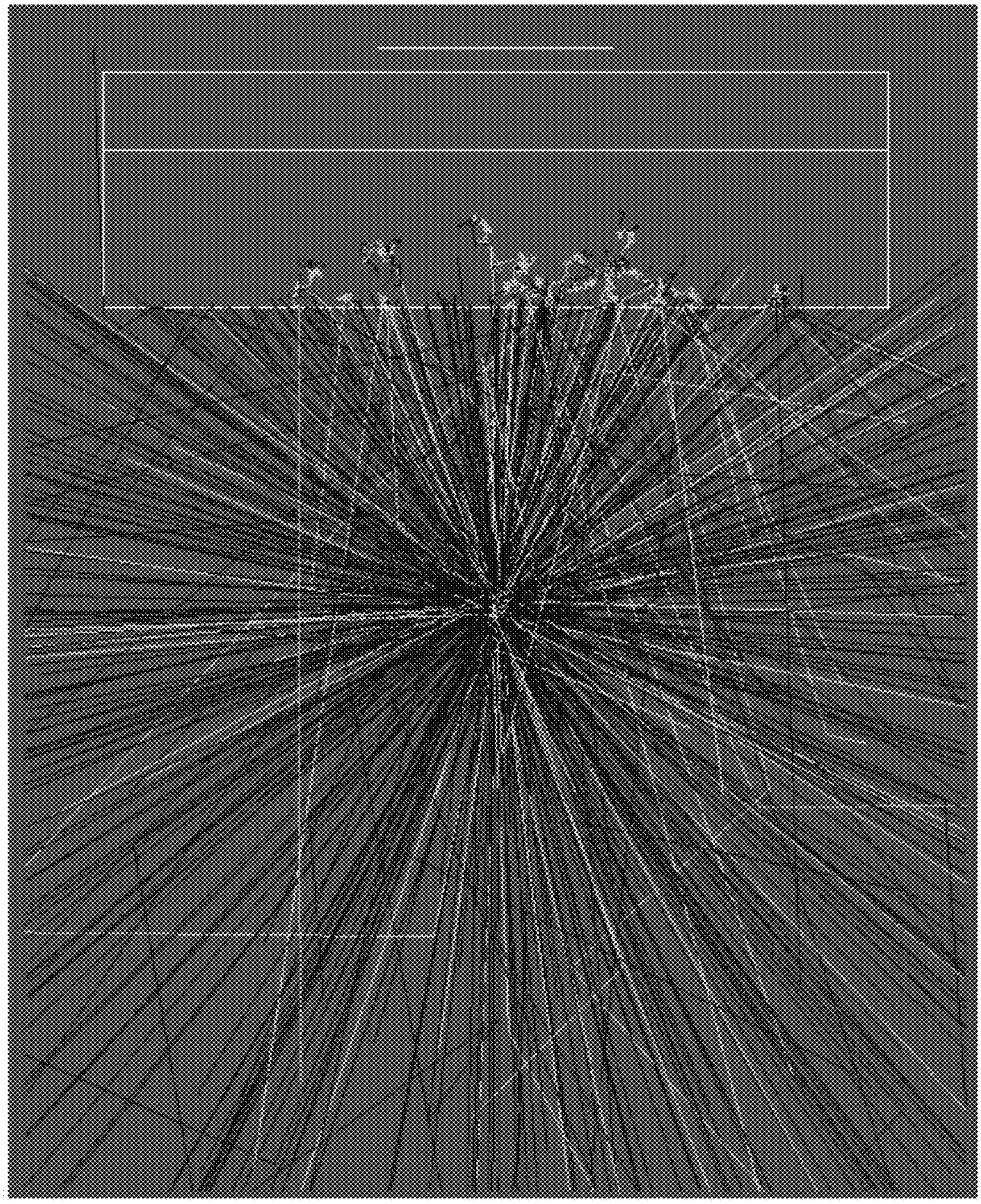
Figure 6B:
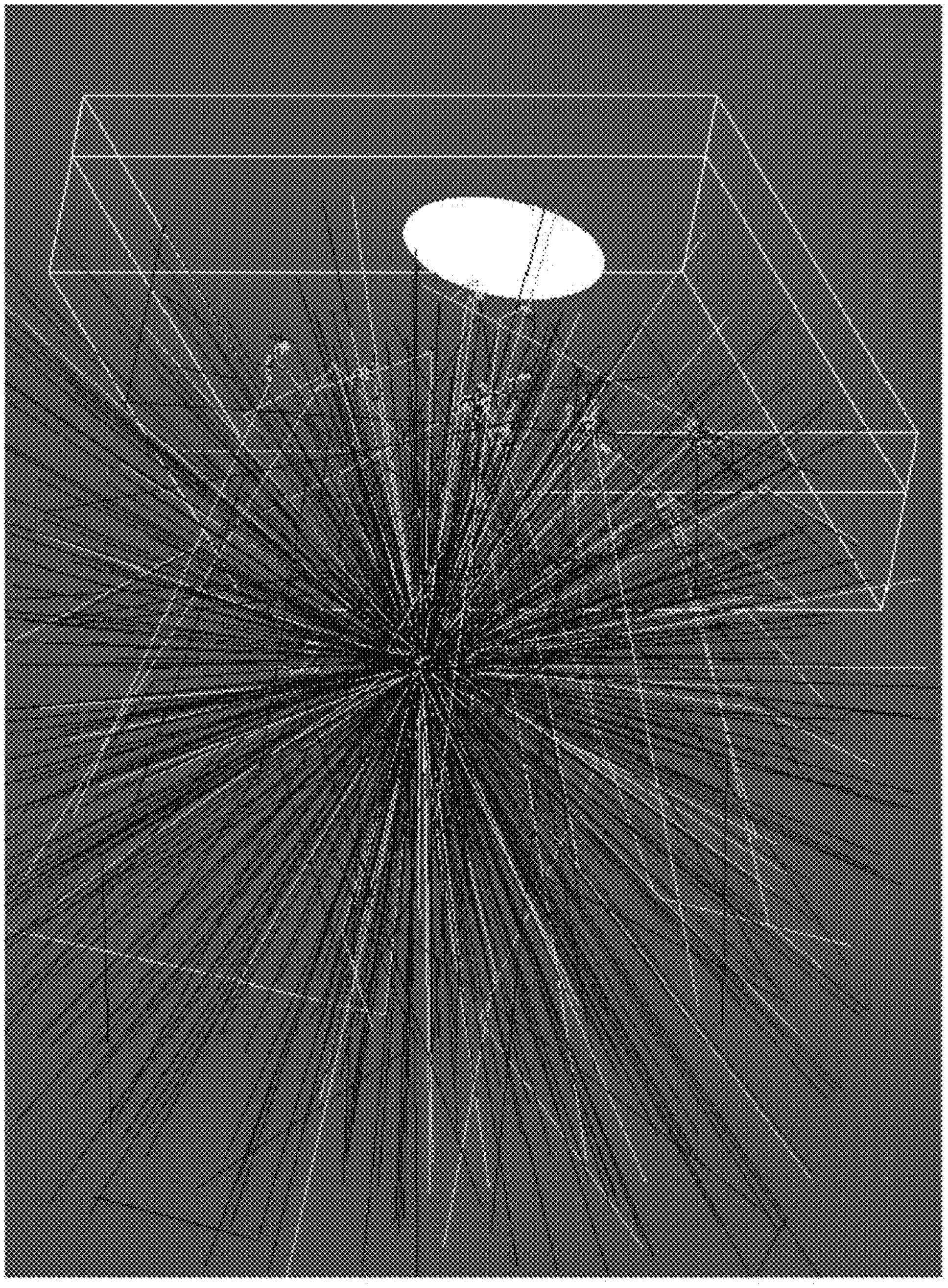
Figure 6C:
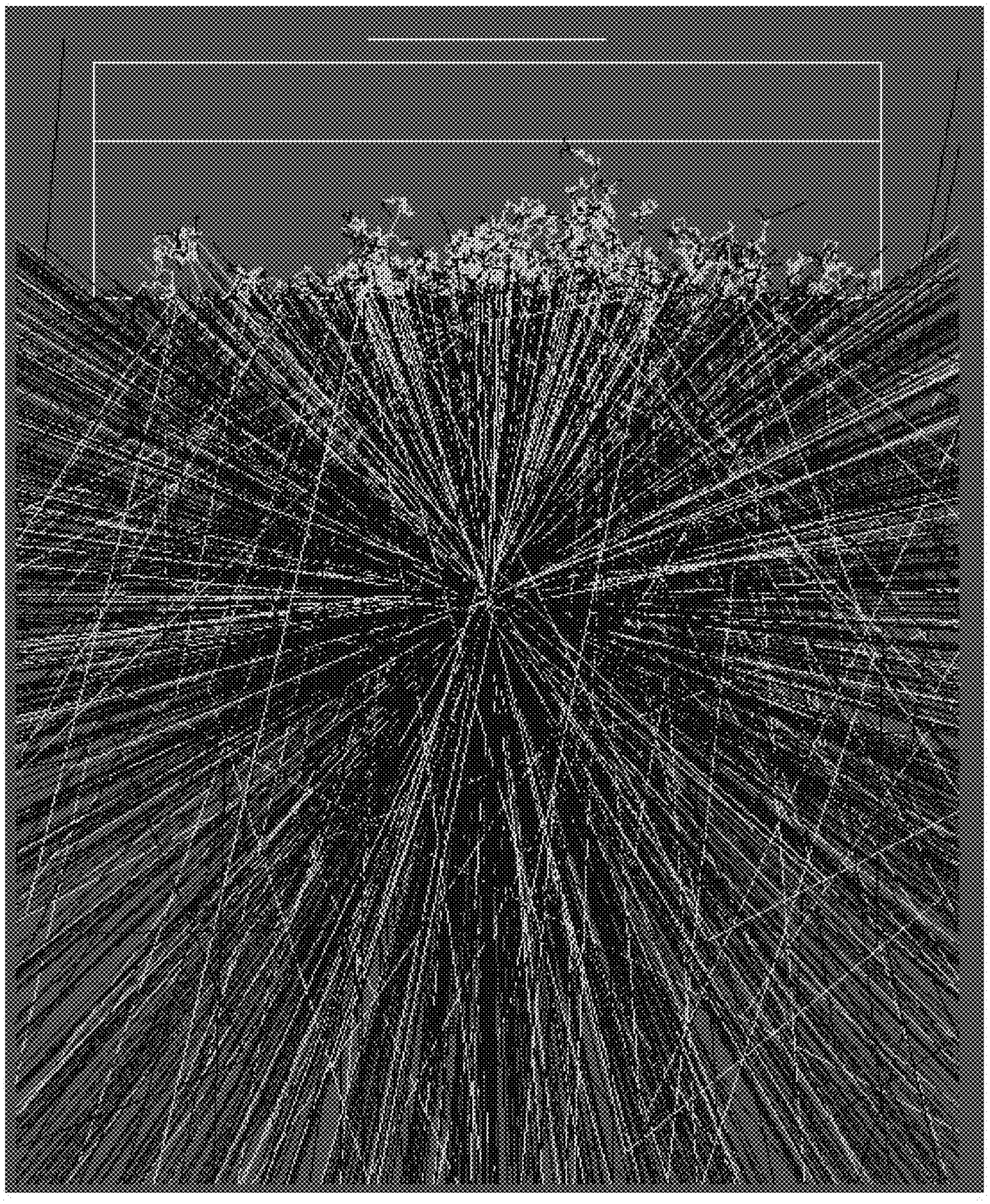

FIG. 5 illustrates unshielded neutron fluence angular distributions directly downstream of a 230 MeV proton beam incident on a water target (simulated proton radiotherapy patient).

The processes listed in the FIG. 2 are the possible interactions evaluated by the simulation within the shielding barrier, and they are based both on the type of radiated particle (the primary particle) and on the secondary particles with which they interact. FIG. 2, however, was generated exclusively for the secondary neutron spectrum produced from a 230 MeV proton beam incident on a water target (simulated human), which comprises about 91% of the shielding challenge in a proton therapy center.

This modeling of a 230 MeV proton beam incident on a water target (simulated patient) within a typical concrete barrier reveals that the dominant neutron motion termination process of a concrete barrier is ionization, with electronic ionization constituting approximately 60% and hadronic ionization constituting approximately 10% of the total neutron termination processes. Nuclear fragmentation only accounts for about 16% of the total termination processes in a concrete barrier. This contrasts with the design presented in embodiments of the present disclosure that relies most heavily on nuclear fragmentation. Nuclear fragmentation absorbs more energy and is thus a more efficient method that allows for a thinner and more transportable barrier. We note again here that this element of transportability and the need for increased efficiency; i.e. a smaller footprint, are additional motivations for separating the structural and shielding components of the solution.

Both the electromagnetic and radiation shielding properties of the proposed technology are multi-directional. In other words, a person standing outside of a radiation therapy treatment room can be shielded from the radiation produced therein by a shielding barrier/wall, or electronics in the treatment room could be shielded from radiation occurring as a result of interactions inside the shielding barriers/walls (secondary, or scatter, radiation) by a strategically-chosen material barrier on the interior wall, and/or electronic components in the room could be shielded from electromagnetic signals or other radiation generated outside of the room. In a multi-material composition barrier approach, as another example, a wall between adjacent treatment rooms could provide shielding to both rooms. Though this is true as well for concrete, the approach presented here provides more efficient shielding (translating to reduced barrier thickness and lower cost) across a broader energy spectrum with the added benefit of efficiently shielding against high-energy, high-fluence, neutron radiation not found in concrete vaults designed and constructed to contain the less energetic photon and electron beams. In another example, sensitive electronics, for example, could be placed in a smaller shielding room inside a larger, unprotected, facility or in a facility where radiation was being produced. In all the above applications, it should be noted that the dual or multi barrier approach allows for multiple materials to be employed in different barriers, once again providing a broader spectrum and optimization of attenuation. While Iron-ore materials may be used for one barrier, for example, less dense materials may be used for another to optimize low energy neutron absorption.

FIGS. 3 and 4 compare, for example, the performance of a conventional concrete wall and a modular, transportable binary barrier wall composed of varying, relative amounts of Magnetite (MR2) and Colemanite (CR2) according to an embodiment of the present disclosure. Here, the ratio $\alpha=L_A/L_B$, i.e. the ratio of thickness of the first barrier encountered by the neutrons (A) to the second (B). $\alpha$ corresponding to infinity, then, is a pure Magnetite barrier. The safety-requisite limitation of 2 mSv/year transmitted Sievert dose ("TSD") typically determines the minimum allowable wall thickness. In this example, the circle size is proportional to the dose of transmitted neutrons in each case; i.e. the TSD. In all cases, the modular transportable wall, leveraging and optimizing the neutron absorption process of nuclear fragmentation, is a superior approach. The results presented in the figure come from a GEANT4 Monte Carlo simulation, and were scaled to a somewhat aggressive annual clinical use dose of a proton therapy machine (corresponding to $5\times10^{15}$ protons/year). As compared to a structural concrete shielding wall relying on ionization as the predominant neutron termination process, the predominant neutron termination process of a shielding wall primarily composed of (a) high-Z element(s) according to the present disclosure is nuclear fragmentation. As herein shown, by selecting and leveraging the more efficient attenuating mechanism of nuclear fragmentation as the predominant neutron termination process, we achieve the greatest radiation absorption and demonstrate an improved, more efficient, shielding barrier.

Thus, as shown in FIGS. 3 and 4, the thickness of a radiation shielding fill material barrier is less than a thickness of a concrete wall to achieve the same Transmitted Sievert Dose. In embodiments, the thickness of a radiation shielding fill material barrier is 5% to 25% less than a thickness of a concrete wall to achieve the same Transmitted Sievert Dose. In embodiments, the thickness of a radiation shielding fill material barrier is 5% to 20% less than a thickness of a concrete wall to achieve the same Transmitted Sievert Dose. In embodiments, the thickness of a radiation shielding fill material barrier is 5% to 15% less than a thickness of a concrete wall to achieve the same Transmitted Sievert Dose. In embodiments, the thickness of a radiation shielding fill material barrier is 5% to 10% less than a thickness of a concrete wall to achieve the same Transmitted Sievert Dose. In embodiments, the thickness of a radiation shielding fill material barrier is 10% to 25% less than a thickness of a concrete wall to achieve the same Transmitted Sievert Dose. In embodiments, the thickness of a radiation shielding fill material barrier is 15% to 25% less than a thickness of a concrete wall to achieve the same Transmitted Sievert Dose. In embodiments, the thickness of a radiation shielding fill material barrier is 20% to 25% less than a thickness of a concrete wall to achieve the same Transmitted Sievert Dose. In embodiments, the thickness of a radiation shielding fill material barrier is 5%, 10%, 15%, 20% or 25% less than a thickness of a concrete wall to achieve the same Transmitted Sievert Dose.

FIGS. 5, 6*a*, 6*b* and 6*c* depict a GEANT4 ray-trace of a beam (in color black) incident on a water target cylinder (simulating a patient) producing secondary neutron rays and other particles emanating from the target, passing through a binary barrier according to an embodiment of the present disclosure, and finally through a simulated detector volume. As shown in the figures, very few neutrons penetrate the first portion of the barrier, an observation that led us to investigate what was the dominant absorption mechanism at work in the primary barrier.

Figure 7:
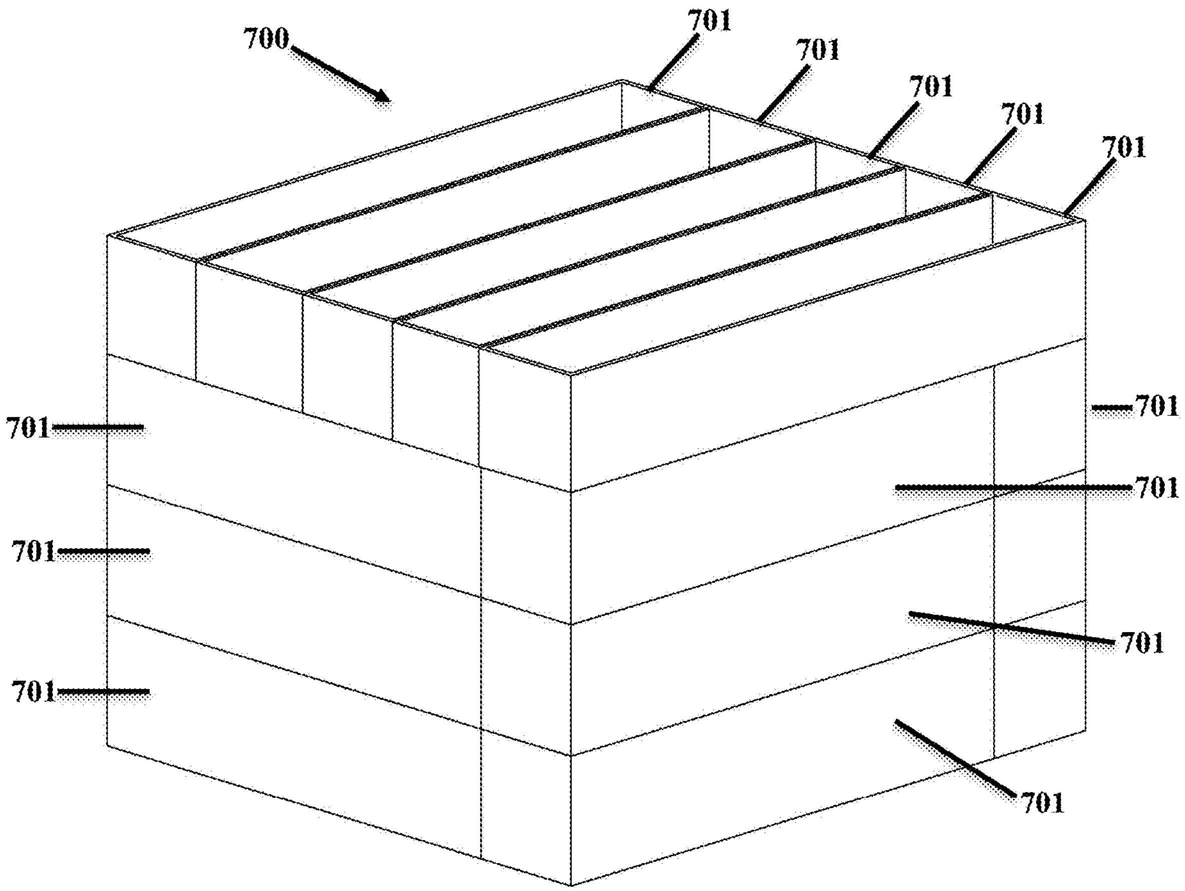
FIG. 7 illustrates a modular proton therapy facility according to an embodiment of the present disclosure.

FIG. 7 illustrates a multi-story modular proton therapy facility 700 according to an embodiment of the present disclosure. The facility includes a plurality of modules 701 configured to be used together to form the facility. In embodiments, one or more of the plurality of modules 701 are filled, at least in part, by shielding fill material (not shown).

Figure 8:
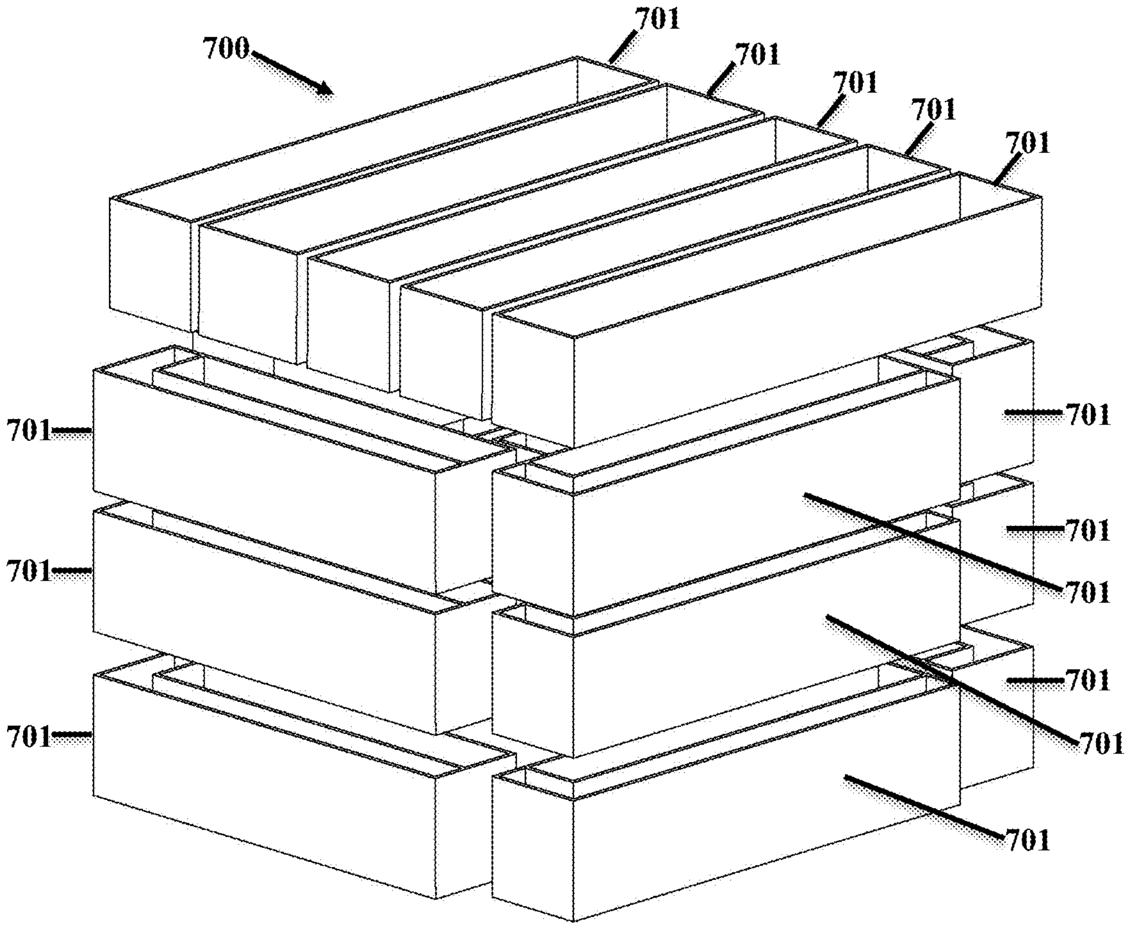
FIG. 8 illustrates an exploded view of the modular proton therapy facility shown in FIG. 7.

FIG. 8 shows an exploded view of the modular proton therapy facility 700 shown in FIG. 7. In some embodiments, a top set of the plurality of modules 701 are a binary layer system having one set of modules (not shown) disposed below another set of modules (not shown), each having the same or differing thicknesses as determined by site specific design parameters.

Figure 9:
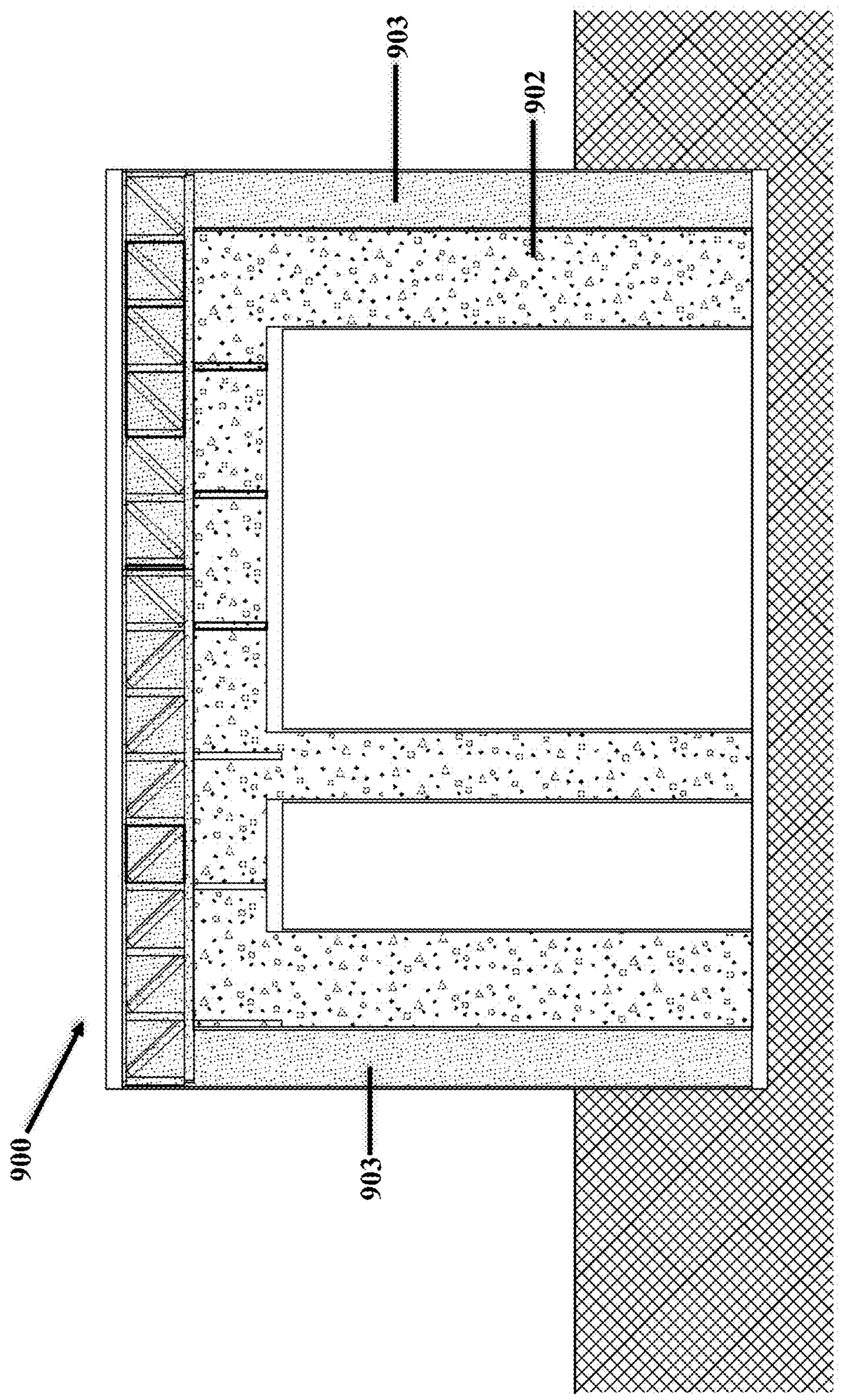
FIG. 9 illustrates a side elevation view in full section of a non-limiting example of a multi-story modular proton therapy facility similar to FIG. 7.
Figure 10:
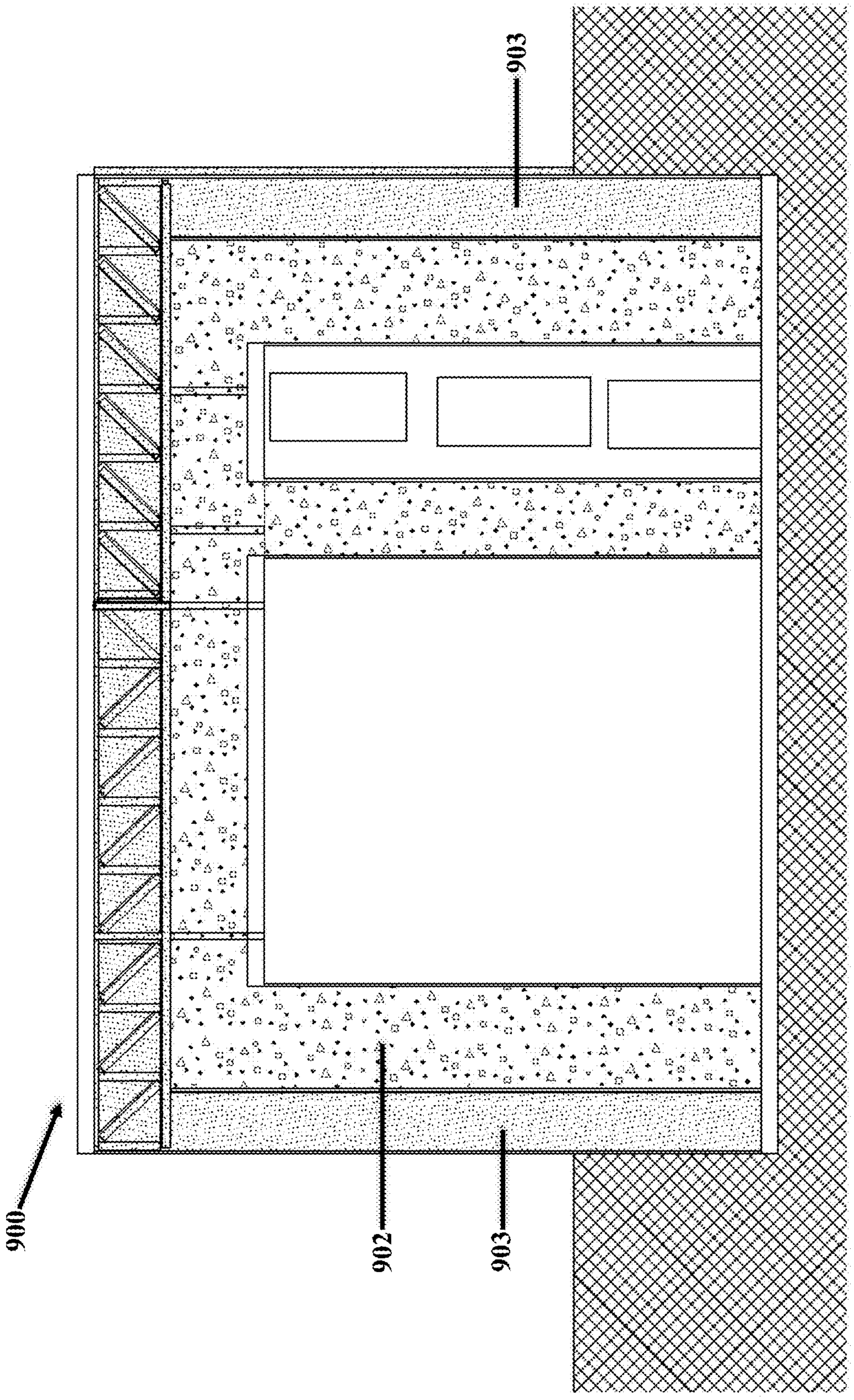
FIG. 10 illustrates a side elevation view in full section of a non-limiting example of a multi-story modular proton therapy facility similar to FIG. 7.

FIGS. 9 and 10 illustrate side elevation views in full section of a non-limiting example of a multi-story modular proton therapy facility 900 similar to the facility 700 shown in FIG. 7. The figures include an optional internal barrier wall 902 positioned between the outer walls 903. FIG. 10 further illustrates the corridors for gaining access to the high radiation areas on each of the lower three (3) levels.

Figure 11:
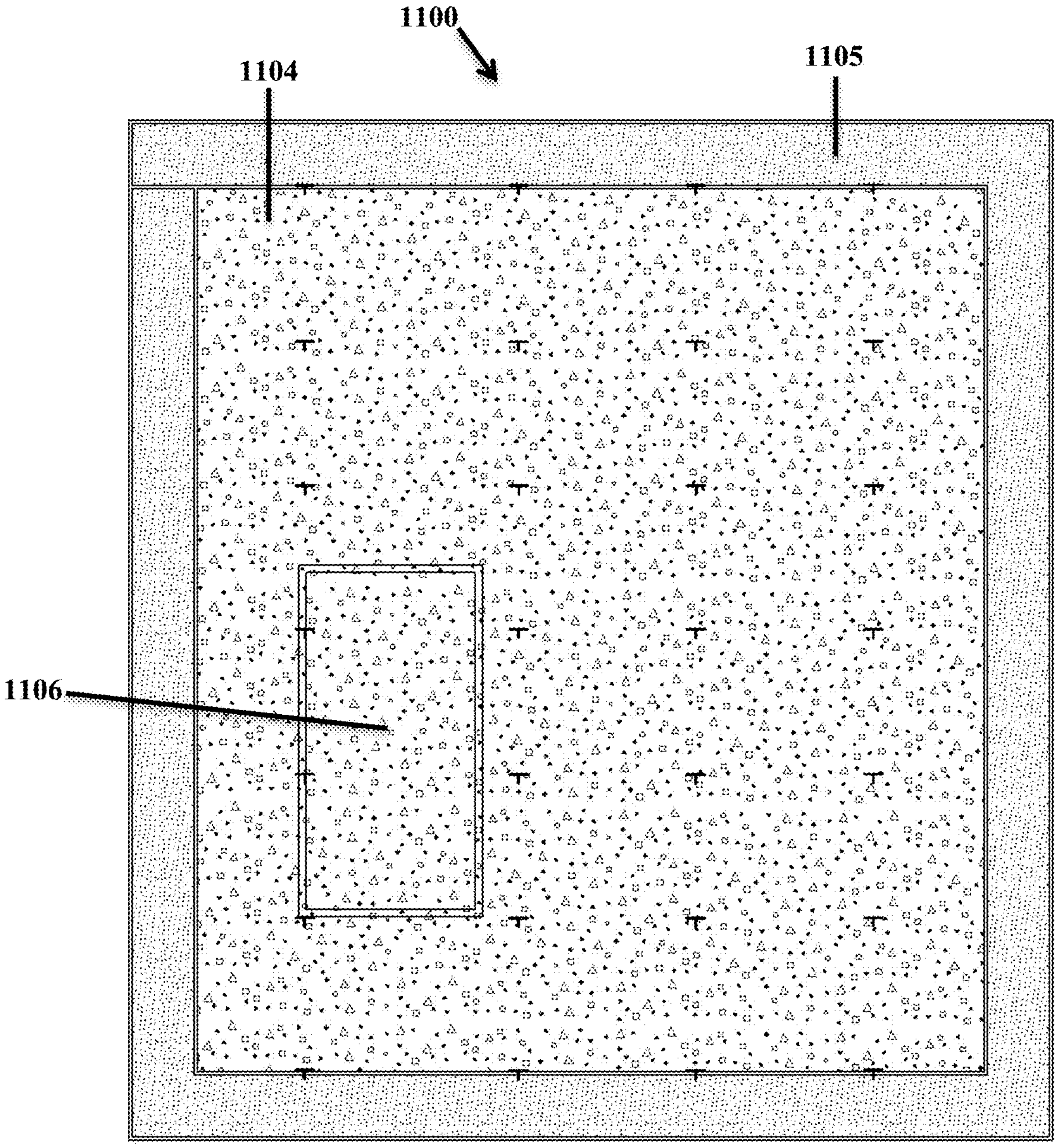
FIG. 11 illustrates a plan view of the bottom set of modules making up the top level of a non-limiting example of a multi-story modular proton therapy facility similar to FIG. 7.

FIG. 11 illustrates a plan view of the bottom set of modules 701 (containing the inner barrier 1104 shielding material) which are part of the top level of a non-limiting example of a multi-story modular proton therapy facility 1100 (and 700). The depicted facility is constructed with two barriers of shielding material (i.e. an inner barrier 1104 and an outer barrier 1105), indicated by the two different shaded areas above and surrounding exemplary treatment room (shown in 1206 of FIG. 12). The top set of modules making up this top level (not shown) would contain the same shielding as the outer barrier 1105. In some embodiments, a removable core 1106 may allow removal of shielding material through the roof for easy access to key components for installation, removal and/or repair.

In some embodiments, the interior space of the facility of the present disclosure can be divided into multiple interior rooms that can be arranged to accommodate people and/or equipment in need of shielding. For example, in some embodiments, people and/or sensitive electronics can be in interior rooms of the facility and shielded from external radiation. Alternatively, in other embodiments, radiation emitting sources can be in interior rooms of a facility and people outside the facility can be shielded by the shielding walls from radiation produced by the primary and secondary radiation emitting sources inside the facility.

Figure 12:
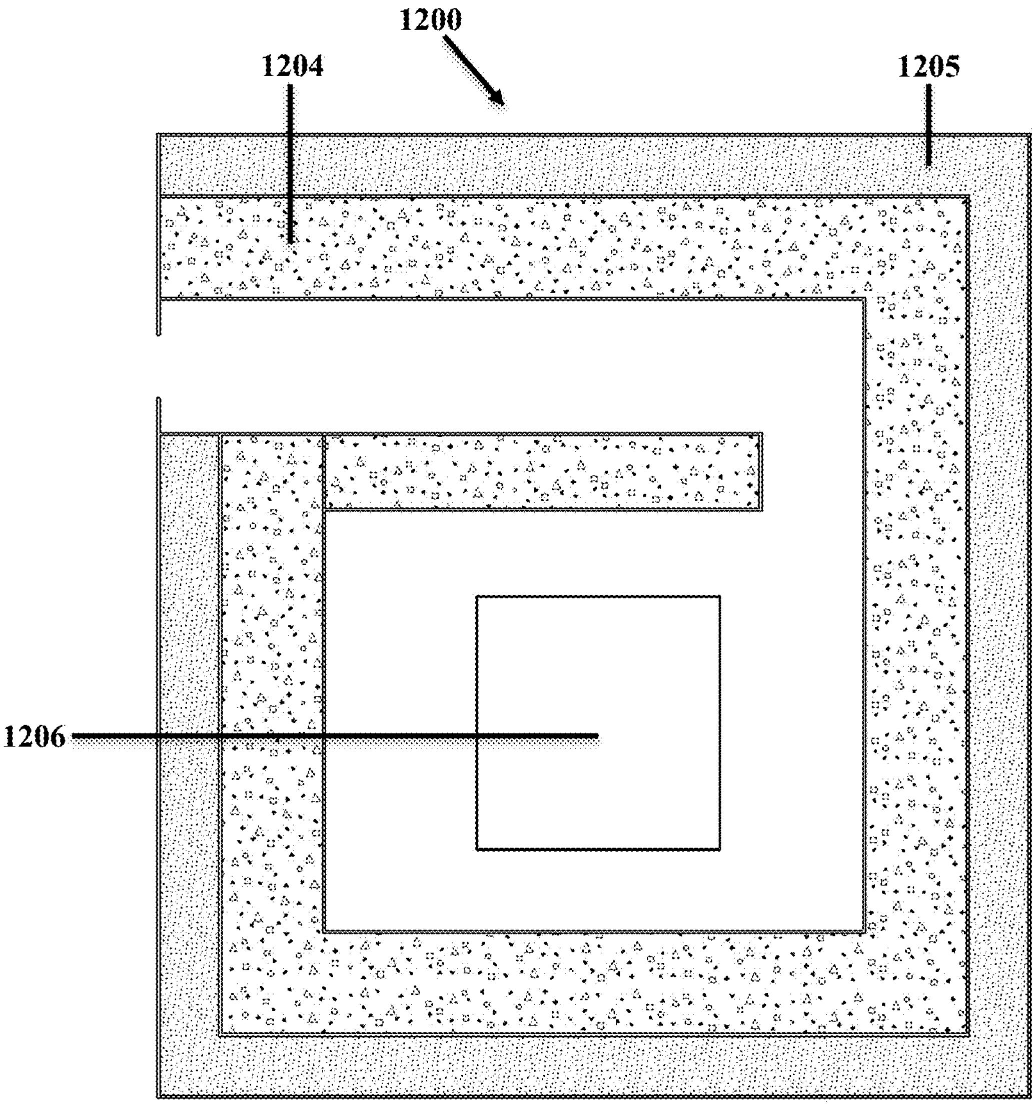
FIG. 12 illustrates a plan view of the lower levels of a non-limiting example of a multi-story modular proton therapy facility similar to FIG. 7. The facility is constructed to have two barriers of shielding material (i.e. an inner barrier and an outer barrier), indicated by the two different shaded areas surrounding the central treatment room. This facility is illustrated with a dual barrier of shielding materials, indicated by the two different shaded areas surrounding the central room. The interior space of this facility may be divided into multiple interior rooms that can be arranged to accommodate people and/or equipment in need of shielding. For example, in some embodiments, people and/or sensitive electronics (not shown) can be located in the interior rooms of the facility and shielded from external radiation. Alternatively, in other embodiments, radiation emitting sources can be located in the interior rooms of this facility and people outside the facility can be shielded by the shielding walls from radiation produced by the primary and secondary radiation emitting sources inside the facility.

FIG. 12 illustrates a plan view of the lower levels of a non-limiting example of a multi-story modular proton therapy facility 1200. FIG. 12 includes an inner barrier 1204, an outer barrier 1205, and an entrance maze (corridor) and treatment room (indicated by the white space) having a proton delivery device 1206 therein.

In one form of the present disclosure, a hadron beam facility is constructed from a series of pre-fabricated modules that are constructed off site, shipped to the site, and then assembled together at the build site to form the structural exoskeleton of the hadron beam facility vault as well as all necessary non-shielding spaces (clinical, mechanical, etc.). The shielding modules are preferably prefabricated with the desired interior structures of the building, using conventional modular construction techniques. However, specific to the unique radiation shielding needs of a hadron beam facility, each shielding module has an exterior structural frame, typically steel, comprised of various panels. Some sides of each module are composed of metal walls ("panels") while other sides are left open. The panels on the various modules are oriented such that when the modules are assembled together, the various panels align with the panels in the modules above or below and optionally with the modules to either side so as to create relatively continuous inner and outer walls that frame out void spaces. These void spaces are subsequently filled with the selected radiation shielding material. The structural frames of the various modules, once connected together, combine to form the inner and outer exoskeleton of the building, and the panels comprising or mounted to the modules combine to form the inner and outer walls that establish the void spaces that contain the radiation shielding fill material. There can be intermediate walls between the inner and outer walls constructed in the same fashion such that there are multiple void spaces that may be filled with different types of shielding material. The modules also contain the interior finishes of the corresponding functional spaces of the facility, such as the waiting room, the control room, the treatment room containing the patient table and gantry for the proton therapy device (for example), etc. Details of building a radiotherapy facility in this modular fashion with a single barrier of granular shielding material is described more fully in U.S. Pat. No. 6,973,758 to Zeik et al. and U.S. Pat. No. 9,027,297 to Lefkus, et al., incorporated herein by reference, and this approach can be applied to create a hadron beam facility by appropriate modification of the interior spaces and the shielding wall arrangements, number of walls and consequent number of void spaces and shielding materials, thicknesses and materials for the desired configuration of the hadron beam facility.

In one refinement, the shielding wall can be created with distinct compartments that can be separately filled with different radiation shielding fill materials. These distinct compartments can serve a number of purposes. For example, by creating distinct compartments through the thickness of the shielding wall, a layered wall can be created with an inner barrier (inner meaning closest to the radiation source) having one type of fill material optimized for one type of attenuating interaction and an outer later (outer meaning farther from the radiation source) optimized for another type of attenuating interaction. For example, the inner barrier may serve to slow high energy neutrons to lower energy states while the outer barrier may serve to absorb the slower, lower energy, neutrons. Additional barriers can be created in similar fashion, resulting in a two, three, four or more shielding barriers. As explained above, the radiation shielding fill material for each barrier is non-structural, and thus a wide range of materials are possible. This approach creates an apparatus for broad energy spectrum shielding, leveraging in each material the dominant process of relevance for any given application (radiation type and energy range).

Most semiconductor electronic components are susceptible to radiation damage. Prolonged exposure to residual ionizing radiation, such as neutrons, may destroy the electronics of the medical equipment in particle therapy facilities. Some medical facilities change charge-coupled device (CDD) cameras monthly and others purchase expensive radiation hardened equipment that can better withstand the challenging environment. To address this, one or more of the shielding barriers can be optimized to reduce the residual ionizing radiation. An example would be a secondary barrier of fill containing a hydrogen-rich material like gypsum (optimal for moderating fast neutrons), or a boron rich material like borax or colemanite (optimal for capturing slow neutrons). This method, while aimed at hadron particle therapy, is applicable to electronic components in a variety of radiation environments, even including low-level radiation environments such as large warehouse-type computer server facilities or strategic ground-based electronics where even terrestrial or cosmic rays can cause loss of security via SEEs. The particles which cause significant soft fails in electronics are neutrons, protons, and pions.

Alternatively, or in addition to the creation of partitions through the thickness of the shielding wall; i.e. inner and outer barriers, lateral partitions can be created in the shielding fill material. One use of lateral partitions is to allow specific sections of the shielding wall to be removed independently of the other sections. This is particularly useful for areas that are exposed to the most radiation and have the potential to become activated. By creating distinct fill containing vessels in the potential activation area, those distinct vessels can be regularly tested and then removed and disposed of should they become activated, without needing to dismantle the entire wall of which they are a part.

In cases where it may be easier to remove the activated sections in large blocks/sections, a grout can be introduced into the fill material to cause it to solidify into the most manageable size, which facilitates the most economical means of removal, transportation and disposal. Fluid conduits can be embedded in the sections to facilitate the introduction of the grout.

Radiation sensors may also be embedded in different sections of the shielding wall. The radiation sensors can detect the level of radiation reaching each wall section and can also be used to determine if a particular section has become activated and needs to be removed. The loose aggregate method suggested here lends itself to this type of apparatus, as it allows for the instrumentation to be accessed and removed for maintenance, upgrades, and repair. This is not possible with sensors embedded in poured concrete without conduits for cable runs to instrumentation, which cause unwanted voids in the shielding.

The panels that create the innermost walls, ceiling, and floor separating the radiation shielding fill from the vault room may be made of steel or other conductive material such that they create a de facto Faraday cage around the central vault room or wherever necessary or desirable. This Faraday cage is beneficial in avoiding communication interference or introduction of noise into any circuitry of any kind in the region of the proton vault, including in the proton accelerator, its related electrical and electronic components and all other computers and electrical and electronic devices throughout and immediately neighboring the facility.

Simulations of the shielding properties of a binary barrier for a proton therapy center according to the present disclosure were modeled for different wall thicknesses. The modeled barrier of the disclosure was a binary barrier with an inner barrier of magnetite (barrier A) and an outer barrier of colemanite (barrier B). Four different ratios of the thickness of the inner magnetite barrier to the thickness of the outer colemanite barrier ($\alpha$=barrier A/barrier B) were modeled: 2, 5, 7 and infinity (the latter corresponding to a single barrier of magnetite and no barrier of colemanite). As compared to the modeled results for a comparably thick concrete wall, the modeled inventive barriers all substantially outperformed the concrete wall. It was found that a 3-meter thickness of the modeled barrier (including a barrier of only magnetite) would provide sufficient shielding for a 230 MeV proton beam energy to reduce the transmitted Seivert dose to well below the target of 2 mSv/year as illustrated by FIGS. 3 and 4.

In embodiments, the present disclosure is designed to make it easier to remove when it has ended its useful life. Decommissioning radiation facilities involves safely removing a facility from service and eliminating or reducing any residual radioactivity to a level that permits any radiation use license to be terminated, with the property released either for unrestricted use or, at worst, under specified restricted conditions.

In embodiments, the present disclosure facilitates a faster and less expensive decommissioning, as any radioactive material could either be retracted from the vessels via suction or hardened into them and subsequently removed in the form of manageably sized blocks. In some embodiments, the granular nature of the material would allow the separation of activated components from non-activated components. In some embodiments, at least some of the separated materials can be saved. In some embodiments, at least some of the separated materials can be stored. In some embodiments, at least some of the separated materials can be disposed of. In some embodiments, at least some of the separated materials can be sold.

Any of the suitable technologies set forth and incorporated herein may be used to implement various example aspects of the disclosure as would be apparent to one of skill in the art. In one aspect of the disclosure, a process for designing and constructing a radiation shielding facility is provided. The initial step is to determine what is to be protected. For example, this may be humans, electronics, or both. Having determined the thing(s) to be shielded, one then determines the neutron energy range of interest, the radiation intensity, and the maximum dosage allowed. As noted above, these quantities are different for humans and electronics.

The next step is to determine where the objects (people or equipment) to be shielded would be located in relation to the source of the radiation. The object(s) to be shielded may be on the same side as the primary radiation source, on the opposite side, or both. This determination leads to a selection of whether to use a simple (uni-directional) layered barrier approach or a bi-directional barrier approach.

Next, based on the neutron energy range and direction radiation would be traversing the barrier, one would assess and determine which type of nuclear attenuation interaction most efficiently attenuates the radiation of that range and type, and then select a shielding material whose composition is leveraged toward the optimum type of nuclear attenuation interaction. The objective is to leverage the material property to increase the relative proportion of the most effective type of nuclear attenuation interactions; i.e. to maximize attenuation by selecting the most effective attenuation method(s) and using the materials that most effectively employ that (or those) method(s). Having selected the material and thus knowing its nuclear attenuation characteristics, a model is used to calculate the wall thickness needed to achieve the level of attenuation required to bring the transmitted radiation dose below the desired threshold.

The process may be repeated for additional material barriers, with the design parameters being the type of shielding material (which determines its shielding characteristics), the thickness of the shielding barrier(s), and the order/arrangement of the barriers if more than one. The objective is to optimize the shielding materials based the characteristics of the entity to be shielded (human and/or electronics) and the relative location(s) of the entity or entities to be protected versus the radiation source and the barrier(s) of the shielding wall.

An iterative process is contemplated in which the free variables can be one or more of (a) number of barriers; (b) material choice for each barrier; (c) material density for each barrier (as may be affected by compaction); (d) thickness of each barrier, (e) order or arrangement of each barrier if more than one, and (f) tolerable activation. While any number of materials can theoretically be chosen, it is envisioned that the materials chosen will be first based on their ability to preferentially leverage the more desirable or effective nuclear attenuation interactions, which, as described above, is a function of the chosen purpose of the shielding wall; i.e. the characteristics of the radiation being addressed as well as what is being protected/shielded.

Moreover, the material selection process, in some embodiments, is directed to materials that are relatively inexpensive and/or readily available, which further restricts the scope of material choices. Thus, once the shielding challenge has been fully understood, determining the cost, availability and suitability of the available shielding materials is the reasonable next step. For example, given a scenario wherein it has been determined that a three-layered wall is the best solution and the desired properties of each layer have been established, one would first select three materials that are suitable to the task; i.e. optimized for a particular type of nuclear attenuation interaction, and that are also sufficiently available, and inexpensive. Then, having decided on the number of barriers and the material to be used in each barrier, a total wall thickness for all barriers combined is calculated, and simulations are then performed to model the radiation attenuation properties and effects using different relative thicknesses of the different barriers making up the shielding wall. The simulations can be optimized to find the most effective relative thicknesses of the different barriers for the given total wall thickness, and even the total wall thickness can be modified (and the iterative process repeated) if the simulation results so indicate.

In embodiments, different total wall thicknesses may be initially selected and the process of optimizing the relative ratios of the relative thicknesses of each barrier may be repeated.

In yet other embodiments, different starting materials can be selected and the process repeated to optimize wall construction parameters for different shielding materials. This method may be of most value in situations where it is desirable to minimize the building footprint, such as due to high land cost or site constraints. A higher cost shielding material may provide superior nuclear attenuation properties and results for a given shielding challenge. Thus, it may allow the overall thickness of the shielding wall to be smaller than if a less expensive shielding material were used, and the overall footprint of the facility may thereby be reduced. In such a case, the additional costs attributable to use of a higher cost shielding material can be offset by reduced land use costs and/or increased design freedom.

In yet another embodiment of the present disclosure, the facility is designed to protect electronic devices or other equipment that may be negatively affected by the radiation. In the embodiment, the facility comprises a plurality of electronic devices or other equipment that may be negatively affected by radiation instead of the device configured to generate a beam.

In view of the above, the fact that the shielding material does not participate in the structure of the facility and can be chosen based solely on its radiation shielding properties, as well as its cost and availability, provides new and unprecedented design freedoms. These design freedoms can be exploited according to the present disclosure to create shielding facility structures in places and at costs and at a pace of construction that were heretofore not possible.

Figure 13:
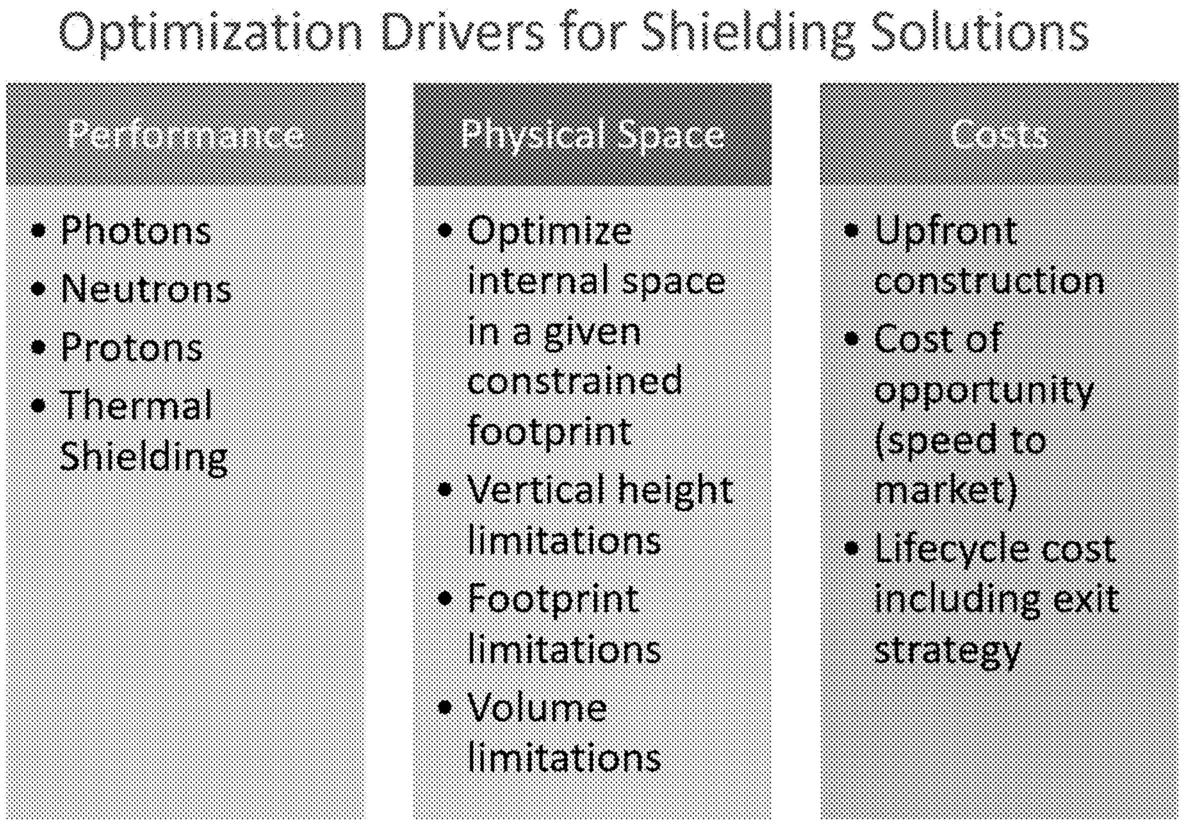
FIG. 13 illustrates non-limiting optimization drivers for the shielding facility of the present disclosure.
Figure 14:
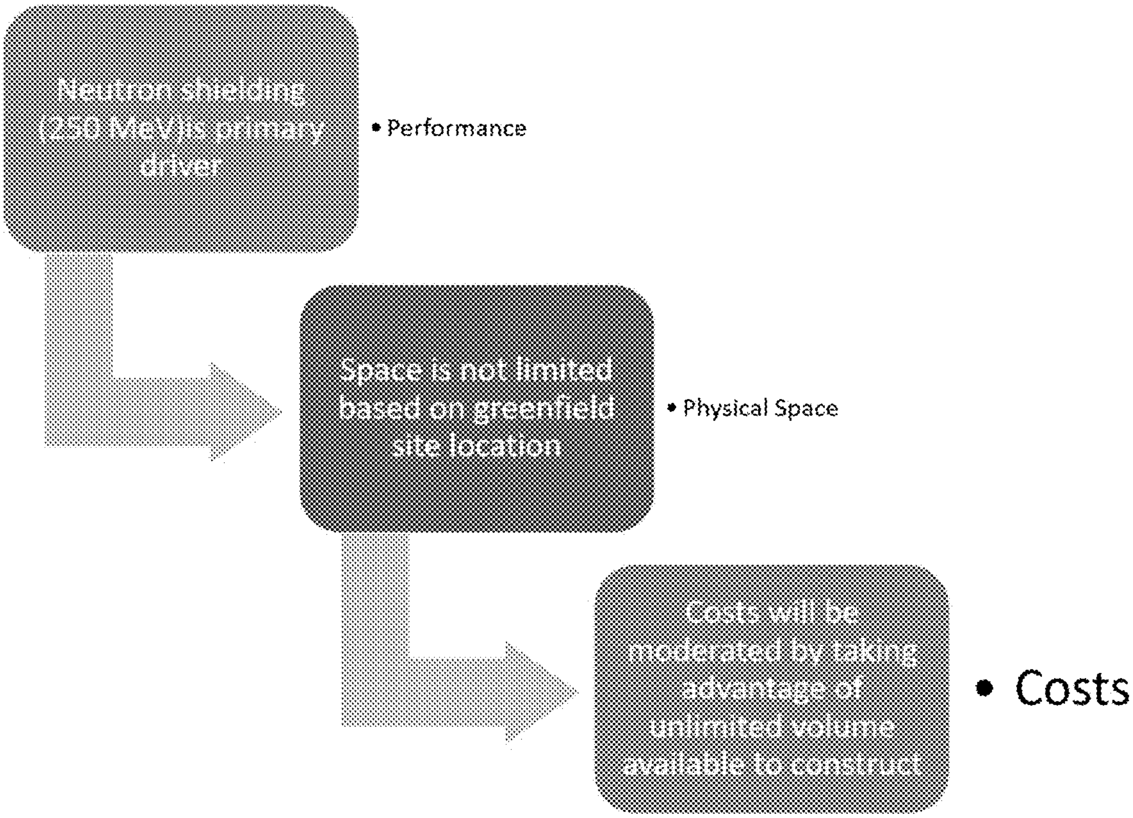
FIG. 14 is an exemplary flow chart depicting how the non-limiting optimization drivers of FIG. 13 may affect the design of an exemplary shielding facility.

In some embodiments, optimization of the facility may be based on three key drivers. These three drivers can include, but are not limited to at least one of shielding performance, shielding space, or shielding cost. A non-limiting optimization solution driven by shielding cost, shielding space, and shielding performance is depicted in FIG. 13. An exemplary flow chart depicting how the non-limiting optimization drivers of FIG. 13 may affect the design of an exemplary shielding facility is shown in FIG. 14.

In some situations, shielding performance is a primary driver for facility design. Shielding performance includes optimization for type of challenge and level of attenuation desired. The next driver is shielding space available. The shielding space available includes optimization of available physical space to achieve a solution. The third driver is the shielding cost. The shielding costs includes optimization of the cost required to achieve acceptable performance.

In some embodiments, a modular approach also allows for different shielding levels in different areas; e.g. higher attenuation in areas of higher radiation exposure or of higher occupancy levels.

In some situations, shielding performance is the primary driver for the facility design. Shielding performance is predicated on providing the most effective solution to attenuate neutrons and other sub atomic particles. In the following non-limiting example, there is no concern for cost. In this example, sensitive electronic equipment requires protection from neutrons and other sub atomic particles. The integrity of the electronics over time requires a Transmitted Sievert Dose (mSv/year) of 0.20 which is ten times less that what humans can safely absorb. Based on the desire to protect the equipment, the highest performing solution must be selected. Additional considerations include the amount of space available. Space is a constraint of the physical barrier. The smaller the allowable area, the more efficient or high performing the barrier must be. The performance of the barrier may be optimized by selection of materials, their purity, compaction and volume. As noted above, in this example, cost would not be a driver. In some situations, performance may have several sub-drivers which may be optimized. For instance, one may optimize shielding performance based on several factors including but not limited to photons, neutrons, protons or a host of other challenges.

In some situations, shielding space is the primary driver for the facility design. Shielding space can be the driver when an existing location provides physical constraints in the allowable amount of area available. In a non-limiting example, the courtyard of a facility is chosen to place new equipment due to proximity to existing operations and/or even sensitivity to public view. Shielding space is less than 3 meters and performance is 2.00 mSv/year. The limited shielding space does not offer adequate square footage for traditional shielding methods of concrete and block and the logistics for placing concrete are difficult. Thus, the efficiency of the shielding is the primary driver. Knowing the gross available area for the barrier, the next consideration would be performance; i.e. which materials would provide adequate protection in that limited space.

In some embodiments, cost is not a primary driver. In some situations, shielding space may have several sub-drivers which may be optimized. For instance, one may optimize shielding space based on several factors including but not limited to vertical or horizontal limitations or gross volume.

In some situations, the cost of shielding is the primary driver for the facility design. The cost of shielding could be the driver in greenfield commercial sites. There would not be space constraints and performance would be typical. In a non-limiting example, a new facility is being built with a medical device typically used in proton therapy. The university customer is required to bring in the lowest cost solution possible. Available land is not an issue and no special attenuation is required. Several acres of open space exist for the project. Dose rate limitations are again moderate at 2.00 mSv/year. The cost of the shielding would be the primary driver with standard performance a secondary consideration. Shielding materials would be selected based on cost of acquisition, which is affected by proximity to the site. In some embodiments there is a trade-off between purity and volume. In some embodiments more volume to achieve the same space equates to higher shipping costs. Thus, the shielding space available would not be a driver. In some situations, shielding cost may have several sub-drivers which may be optimized. For instance, one may optimize shielding costs based on several factors including but not limited to at least one of up-front savings, long-term savings, or time-savings.

Within the three key drivers exist opportunities for optimization within the technical calculations. Depending, at least in part, on type and energy of the radiation to be shielded, different interactions may be leveraged and balanced. In some embodiments, the optimization can be conducted using a statistical weighting algorithm. Non-limiting quantities such as material cost or barrier size may be assigned an array of values through which the optimization algorithm can re-weigh the results to determine an optimized solution. In embodiments, Bayesian optimization of the weighted calculations may be deployed via a Monte Carlo sampling technique to scan through numerous options with statistical rigor in contrast to conventional shielding algorithms.

The flexibility of the methods detailed herein will allow designers through algorithms and potentially machine learning and Artificial Intelligence, to evaluate various scenarios to achieve an established goal. Using this method, the range of materials, physical space, types of radiation (photonic, atomic or sub-atomic), specific energies and/or range of energies.

The values for the energies are not limited. For instance, in some embodiments the energies can be as low as 1 keV. In some embodiments, the energies can be as high as 1000 GeV. Desired performance can also be optimized using predictive analytics. These methods, in some embodiments, may achieve results significantly different than the traditional approach of standard construction which may include limited variables by simply using more volume and/or denser aggregates.

Non-Limiting Example: Proton Radiation Therapy Facility:

In embodiments, a first step in creating a proton therapy facility is to consider the treatment room wall that is protecting radiation therapists from the radiation being used to treat a patient lying on a bed inside an adjacent treatment room. The neutron energy for this application will range from near zero MeV up to the beam energy minus the binding energy of the shielding material(s). A maximum allowable Transmitted Sievert Dose for a radiation therapist is 2 mSv/Yr (the "Threshold Transmitted Sievert Dose").

Therapists work outside of the treatment room while beam is being delivered, so the design objective must consider neutrons coming from the room during beam delivery through the barrier and into areas where the therapist(s) could be working. (Protons are quickly and easily stopped and are not a factor beyond the fact that they spawn neutrons prior to being stopped.) In this application, it has been found that optimum shielding may be achieved by leveraging nuclear fragmentation processes via an iron-ore material. As illustrated herein, reduction of the Transmitted Sievert Dose (TSD) to below the Threshold Transmitted Sievert Dose can be achieved using a single barrier of such a material. In this case, a requisite barrier thickness would be less than concrete, which is typically deployed for a combination of structural and shielding properties.

Additional barriers composed of different shielding materials may be included and the relative thicknesses of the multiple barriers optimized as described above. Multiple barriers of material may be used throughout the shielding walls of the facility or only in select locations. The locations for additional shielding barriers may be selected based on the anticipated radiation spectrum hitting different areas of the shielding wall, because in a particle therapy facility, the radiation spectrum is not uniform in all directions. The locations for additional shielding barriers may further be selected based on who or what is on the other side of that barrier, such as sensitive electronics or an un-controlled high occupancy waiting room. Thicker shielding, for instance, can be placed in the areas directly opposite the beam direction (which may form a vertically oriented circular "band" around a gantry which rotates a full 360 degrees).

Additional barriers may be added and/or optimized based on the location of electronics within the treatment room. For this optimization, backscatter radiation (the radiation that is scattered back into the room after high energy neutrons (also called secondary, or scatter, radiation) have entered the shielding wall), is modeled and interior barriers of shielding material are selected to attenuate the radiation that would otherwise scatter back into the room and damage the electronics.

Having selected shielding materials, iterative modeling of the combined radiation shielding characteristics is performed as explained above to find the necessary thicknesses of the different barriers to achieve the design parameter (i.e. Threshold Transmitted Sievert Dose to therapist of less than 2 mSv/year and/or the established maximum permissible dose to equipment).

Current simulations have revealed magnetite to be a desirable shielding material for this type of proton facility. Hematite has also been found to be acceptable and may be less expensive.

Although exemplary embodiments and applications of the disclosure have been described herein, including as described above and shown in the included example Figures, there is no intention that the disclosure be limited to these exemplary embodiments and applications or to the manner in which the exemplary embodiments and applications operate or are described herein. Indeed, many variations and modifications to the exemplary embodiments are possible, as are applications in fields beyond medicine such as research, power or strategic facilities, as would be apparent to a person of ordinary skill in the art. The disclosure may include any device, structure, method, or functionality, as long as the resulting device, structure or method falls within the scope of one of the claims that are allowed by the patent office based on this or any related patent application.

While a number of embodiments of the present disclosure have been described, it is understood that these embodiments are illustrative only, and not restrictive, and that many modifications may become apparent to those of ordinary skill in the art. Further still, the various steps may be carried out in any desired order (and any desired steps may be added and/or any desired steps may be eliminated).

We claim:

1. A facility comprising:

a) a device configured to generate a beam of radiative energy having an energy range of 5 MeV to 500 MeV;

b) a first shielding barrier surrounding the device, wherein a thickness of the first shielding barrier is 0.5 meter to 6 meters, and wherein the first shielding barrier comprises:

i) a first radiation shielding wall surrounding the device;

ii) a second radiation shielding wall surrounding the first radiation shielding wall; and iii) a first radiation shielding fill material positioned between the first radiation shielding wall and the second radiation shielding wall, wherein the first radiation shielding fill material comprises at least fifty percent by weight of an element having an atomic number from 12 to 83; and c) a second shielding barrier, wherein a thickness of the second shielding barrier is from 0.5 meter to 6 meters, and wherein the second shielding barrier comprises:

i) a third radiation shielding wall surrounding the second radiation shielding wall of the first shielding barrier; and ii) a second radiation shielding fill material between the second radiation shielding wall of the first shielding barrier and the third radiation shielding wall of the second shielding barrier, wherein the second radiation shielding fill material comprises at least 25 percent by weight of an element having an atomic number from 1 to 8, wherein a ratio of the thickness of the first shielding barrier to the thickness of the second shielding barrier is equal to or greater than 2.

2. The facility of claim 1, wherein the element having an atomic number from 12 to 83 is selected from the group consisting of iron, lead, tungsten, and titanium.

3. The facility of claim 1, wherein the first radiation shielding fill material comprises at least fifty percent by weight of at least one of magnetite or hematite based on the total weight of the first radiation shielding fill material.

4. The facility of claim 3, wherein the first radiation shielding fill material is granular.

5. The facility of claim 1, wherein the energy range is selected from the group consisting of 5 MeV to 70 MeV, 5 MeV to 250 MeV, and 5 MeV to 300 MeV.

6. The facility of claim 1, wherein at least one of the first radiation shielding wall or the second radiation shielding wall comprises panels mounted onto a structural exoskeleton.

7. The facility of claim 1, wherein at least one of the first radiation shielding wall or the second radiation shielding wall comprises steel.

8. The facility of claim 1, wherein the third radiation shielding wall comprises panels mounted onto a structural exoskeleton.

9. The facility of claim 1, wherein the third radiation shielding wall comprises steel.

10. The facility of claim 1, wherein the element having an atomic number from 1 to 8 is selected from the group consisting of hydrogen, carbon, oxygen and boron.

11. The facility of claim 1, wherein the second radiation shielding fill material comprises at least one of borax, gypsum, colemanite, a plastic composite material, or lime.

12. The facility of claim 1, wherein the beam of radiative energy comprises at least one of: particles or photons.

13. The facility of claim 12, wherein the particles are hadrons.

14. The facility of claim 13, wherein the hadrons comprise at least one of protons, neutrons, pions, or heavy ions.

15. The facility of claim 1, wherein the first shielding barrier is structural.

16. The facility of claim 1, wherein the first shielding barrier is non-structural.

17. A facility comprising:

a) a plurality of electronic devices;

b) a first shielding barrier surrounding the plurality of electronic devices, wherein a thickness of the first shielding barrier is 0.5 meter to 6 meters, wherein the first shielding barrier comprises:

i) a first radiation shielding wall surrounding the plurality of electronic devices;

ii) a second radiation shielding wall surrounding the first radiation shielding wall; and iii) a first radiation shielding fill material positioned between the first radiation shielding wall, wherein the first radiation shielding fill material comprises at least fifty percent by weight of an element having an atomic number from 12 to 83; and c) a second shielding barrier, wherein a thickness of the second shielding barrier is from 0.5 meter to 6 meters, and wherein the second shielding barrier comprises:

i) a third radiation shielding wall surrounding the second radiation shielding wall of the first shielding barrier; and ii) a second radiation shielding fill material between the second radiation shielding wall of the first shielding barrier and the third radiation shielding wall of the second shielding barrier, wherein the second radiation shielding fill material comprises at least 25 percent by weight of an element having an atomic number from 1 to 8, wherein a ratio of the thickness of the first shielding barrier to the thickness of the second shielding barrier is equal to or greater than 2.

18. The facility of claim 17, wherein the element having atomic number between 12 and 83 is selected from the group consisting of iron, lead, tungsten and titanium.

19. The facility of claim 17, wherein the first radiation shielding fill material comprises at least fifty percent by weight of at least one of magnetite or hematite based on the total weight of the first radiation shielding fill material.

20. The facility of claim 17, wherein the first radiation shielding fill material is granular.

21. The facility of claim 17, wherein at least one of the first radiation shielding wall and the second radiation shielding wall comprises panels mounted onto a structural exoskeleton.

22. The facility of claim 17, wherein at least one of the first radiation shielding wall or the second radiation shielding wall comprises steel.

23. The facility of claim 17, wherein the third radiation shielding wall comprises panels mounted onto a structural exoskeleton.

24. The facility of claim 17, wherein the third radiation shielding wall is steel.

25. The facility of claim 17, wherein the element having atomic number between 1 and 8 is selected from the group consisting of hydrogen, carbon, oxygen and boron.

26. The facility of claim 17, wherein the second radiation shielding fill material comprises at least one of borax, gypsum, colemanite, a plastic composite material, or lime.

27. The facility of claim 17, wherein the first shielding barrier is structural.

28. The facility of claim 17, wherein the first shielding barrier is non-structural.

* * * * *